(12) United States Patent
Lovoi

(10) Patent No.: US 6,480,699 B1
(45) Date of Patent: Nov. 12, 2002

(54) STAND-ALONE DEVICE FOR TRANSMITTING A WIRELESS SIGNAL CONTAINING DATA FROM A MEMORY OR A SENSOR

(75) Inventor: Paul A. Lovoi, Saratoga, CA (US)

(73) Assignee: Woodtoga Holdings Company, Santa Clara, CA (US)

( * ) Notice: Subject to any disclaimer, the term of this patent is extended or adjusted under 35 U.S.C. 154(b) by 0 days.

(21) Appl. No.: 09/141,826

(22) Filed: Aug. 28, 1998

(51) Int. Cl.⁷ ................................................ H04B 5/00
(52) U.S. Cl. ........................................ 455/41; 455/558
(58) Field of Search ............................ 455/14, 90, 350, 455/558, 575, 41; 379/357; 235/380, 384, 385, 474, 492; 902/26; 340/693.1

(56) References Cited

U.S. PATENT DOCUMENTS

| | | | | |
|---|---|---|---|---|
| 5,041,826 A | * | 8/1991 | Milheiser | 455/41 |
| 5,070,500 A | * | 12/1991 | Horinouchi et al. | 455/41 |
| 5,345,231 A | * | 9/1994 | Koo et al. | 455/41 |
| 5,384,834 A | | 1/1995 | Sato et al. | 379/88 |
| 5,497,140 A | * | 3/1996 | Tuttle | 340/693.1 |
| 5,617,449 A | | 4/1997 | Tanaka | 375/222 |
| 5,887,266 A | | 3/1999 | Heinonen et al. | 455/558 |
| 5,894,597 A | | 4/1999 | Schwartz et al. | 455/558 |
| 5,915,226 A | | 6/1999 | Martineau | 455/558 |
| 6,078,806 A | * | 6/2000 | Heinonen et al. | 455/558 |
| 6,097,967 A | * | 8/2000 | Hubbe et al. | 455/558 |
| 6,101,372 A | * | 8/2000 | Kubo | 455/558 |
| 6,118,986 A | * | 9/2000 | Harris et al. | 455/558 |
| 6,167,094 A | * | 12/2000 | Reiner | 455/41 |

* cited by examiner

Primary Examiner—Nay Maung
(74) Attorney, Agent, or Firm—Skjerven Morrill LLP

(57) ABSTRACT

A stand-alone device includes an integrated circuit (IC) die (optionally free of conventional IC packaging and bond pads) that responds to a signal by (1) storing energy retrieved from the signal, and (2) using the stored energy to generate another signal that is encoded with information provided by a data source (such as a memory or a sensor depending on the implementation) that is included in the device. The IC die includes a power supply, a signal transmitter, and optionally includes an antenna. During operation of one embodiment, the power supply receives from the antenna electrical energy extracted from a portion of a radio frequency signal incident on the IC die. The power supply stores the energy in an energy store over a period of time, and thereafter supplies at least a portion of the stored energy to the signal transmitter. The signal transmitter uses the energy to generate an electrical signal carrying the information from the data source, and on receipt of the electrical signal the antenna transmits another radio frequency signal containing the information. All parts of the IC die are coupled to each other by electrical conductors formed within the IC die. The device is used as a stand-alone component, i.e. free of connections to other electronic components. In one such case the IC die includes the antenna, and all interactions with the device are performed by wireless signals.

72 Claims, 10 Drawing Sheets

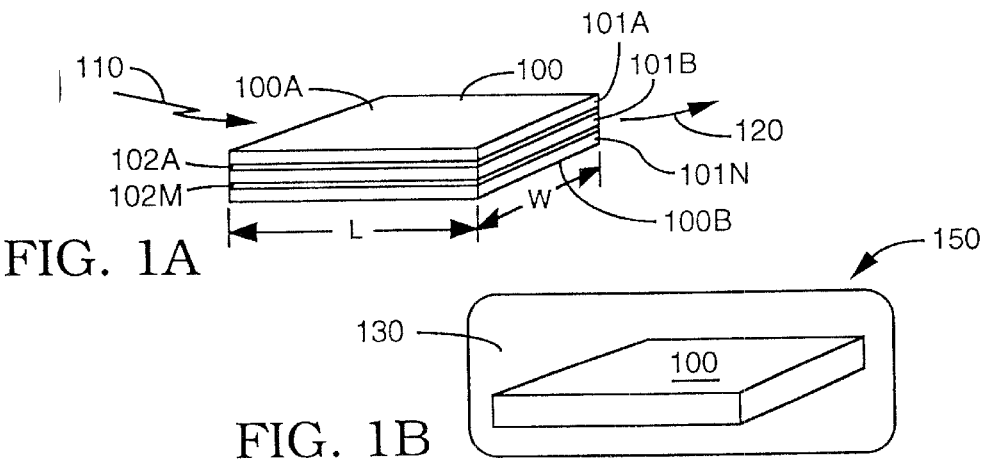
FIG. 1A
FIG. 1B
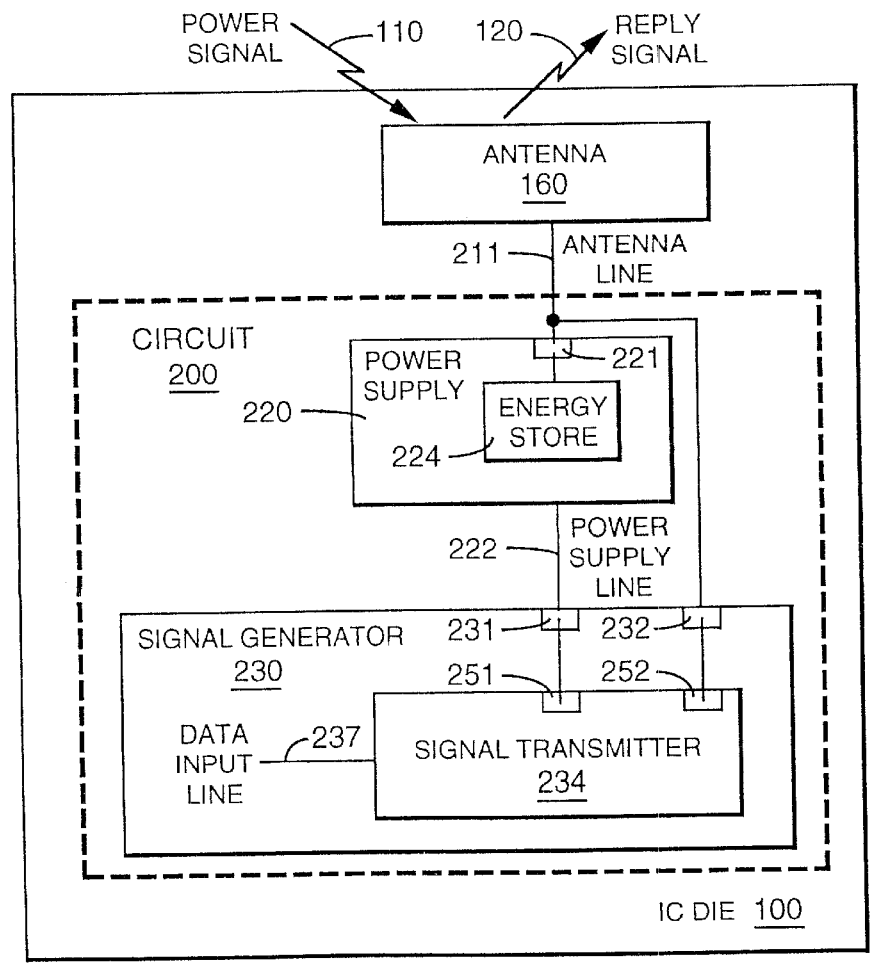
FIG. 2A

WHERE $f_0 = \dfrac{1}{2\pi R1\, C1}$  WHERE R1 = R2
C1 = C2

STAND-ALONE DEVICE FOR TRANSMITTING A WIRELESS SIGNAL CONTAINING DATA FROM A MEMORY OR A SENSOR

BACKGROUND OF THE INVENTION

Cards containing transponders, such as radio frequency (RF) transponders, are conventionally used to electronically control, detect, and track a variety of items to which the cards are attached. Specifically, such a card (also called "identification tag"), when affixed to or embedded into virtually any object (including livestock and laboratory animals), individually identifies the object using a unique, factory-programmed unalterable code held in a memory mounted on the card and connected to the transponder.

A transponder in such a card can be designed to reflect an incident signal from an interrogation unit (also called "reader") in real time, as described for example, in U.S. Pat. No. 5,479,172 (wherein a "power supply voltage has a time varying voltage waveform corresponding to the electric field generated by a reader/controller"; see abstract). However, such a real time transponder requires transmission of a large amount of energy because energy of the incident signal and energy of the reflected signal both dissipate at a rate of $1/r^2$, where r is the distance of the transponder from the reader. Therefore a conventional reader of such identification tags must sense a reflected signal having a strength several orders of magnitude smaller than the strength of the signal sent by the reader.

For another example of such prior art devices, see "RF Transponder Embedded In Auto Ignition Keys Stymies Car Thieves" by Milt Leonard, in Electronic Design, Dec. 2, 1993, pages 35–36.

SUMMARY OF THE INVENTION

A device (also called "energy holding tag") in accordance with this invention absorbs and holds (i.e. temporarily stores) energy over a period of time from a first signal, hereinafter "power signal," and thereafter uses the stored energy to generate a second signal, hereinafter "reply signal." The device encodes the reply signal with data from a data source that includes for example a memory or a sensor or both. The circuit in the device includes a power supply that extracts energy from the power signal, and a signal generator that generates the reply signal. The signal generator includes a signal transmitter that encodes data into an electrical signal for transmission in the reply signal.

In one embodiment, the power supply rectifies and stores energy from the power signal over a period of time, and thereafter supplies at least a portion of the stored energy on another line (also called "power supply line") coupled to the signal transmitter. In one implementation, the power supply includes a rectifier (such as a diode or a p-n junction) having an input terminal (also called power input terminal), and an energy store (such as a capacitor, also called "energy storage capacitor") coupled to the rectifier thereby to store energy from the power signal, during the period of time (called the "absorption period"), e.g. 500 ms. The energy storage capacitor has a predetermined capacitance that is selected to provide sufficient power to the signal transmitter for another period (called the "generation period") of time e.g. several microseconds.

The signal transmitter has a reference voltage terminal that is coupled to the power supply. The signal transmitter uses energy drawn from the energy store via the reference voltage terminal during yet another period of time (called the "transmission period") to generate a signal that is transmitted as the reply signal. Preferably, but not necessarily, the transmission period is separated from the absorption period by a delay period, e.g. a random delay (such as any period in the range of 0 and 300 ms). The transmission period is at least an order of magnitude smaller than the absorption period so that the reply signal is transmitted at a higher power than the power possible if the two periods are of the same order of magnitude. The one or more (for example 5) orders of magnitude difference between the two periods allows for compression of the stored energy for transmission of the higher power reply signal. Implementation of a random delay allows a number of energy holding tags of the type described herein to be simultaneously activated by an interrogation unit that transmits a power signal just once if each tag transmits in a unique time period. Alternatively, the interrogation unit may transmit a power signal multiple times (e.g. two or three times) to handle collisions caused by simultaneous transmission of a reply signal by two or more of such energy holding tags.

In this particular embodiment, the signal generator also includes, in addition to the signal transmitter, a data source that supplies data to the signal transmitter. The data source has a terminal coupled to a data input line of the signal transmitter. Depending on the implementation, the data source provides on the data input line data from any circuit, such as a non-volatile memory or a sensor (also called environmental sensor) that can sense one or more environmental conditions, for example, temperature, pressure or humidity of the atmosphere surrounding the device. Note that other types of data sources can be used in other embodiments.

In one embodiment, the device is a "stand alone" device that communicates with an interrogation unit via wireless signals. In this embodiment, each of the power signal and the reply signal are electromagnetic signals (such as radio frequency signals). Therefore, one variant of the device includes a single antenna that receives as well as transmits the respective power and reply signals, in a time shared manner. In another variant, two distinct antennas are included in the device, one for receipt and the other for transmission. The power supply of the device receives an electrical signal on a line (also called "antenna line") coupled to the antenna when a power signal at a predetermined frequency is incident on the antenna. The signal generator of the device transmits a second electrical signal to the antenna line after a predetermined amount of energy is extracted from the power signal by the power supply, the predetermined amount of energy being at least sufficient to generate the second electrical signal.

In one embodiment, the energy holding tag includes an integrated circuit (abbreviated "IC") die that is the sole electronic component in the energy holding tag. The IC die is used as a single (i.e. monolithic) piece free of any electrical connection, e.g. to other discrete electronic components. Such an IC die communicates via electromagnetic signals (such as a radio frequency signal). That is, the energy holding tag of this embodiment does not have various conventional parts, such as bond pads, bond wires, lead frame, or package terminals (such as leads of a pin grid array package or pads of a ball grid array package). In one such energy holding tag, an RF antenna, a power supply, a signal generator and the various conductive lines coupling these parts are all formed as portions of a single integrated circuit (IC) die (also called a "bare die") that is unconnected to any other electronic component. In one implementation of the just-discussed embodiment, the energy holding tag includes an encapsulant, such as a glop of epoxy that covers (partially in one embodiment and completely in another embodiment) the single IC die, thereby to provide protection to the die from environmental factors such as humidity.

In an alternative implementation, the energy holding tag is implemented as an unpackaged die (that does not have bond pads, bond wires, die attach adhesive and glop of epoxy), i.e. a bare IC die without any packaging whatsoever. In another alternative embodiment, the energy holding tag includes an IC die having a connection to an antenna that is formed on a substrate (such as a postage stamp or mailing label) to which the die is attached (e.g. by electrically conductive glue). In such an implementation, the IC die has at least one bond pad for coupling to the antenna (and may have another bond pad for coupling to ground).

Fabrication of an energy holding tag that is devoid of electrical connections (or that has a single connection) is less expensive than fabrication of packaged ICs used in a conventional transponder, due to (1) elimination of conventional integrated circuit package, (2) reduction in die size from elimination of a number of bond pads, and (3) elimination of testing required prior to use of a die packaged in the conventional manner. Moreover, in one embodiment, the transmission period is smaller than the absorption period, and therefore the reply signal is stronger (e.g. up to 100,000 times stronger) than a reflected signal from a prior art transponder of the type described above (in the background section). Furthermore, in one embodiment, the reply signal is also stronger than the power signal.

The signal received by the interrogation unit is thereby increased allowing the energy holding tag to have an antenna sufficiently smaller in size to fit in or on the die in one embodiment.

So, as compared to a prior art reader, an interrogation unit that senses a reply signal from a energy holding tag (as described herein) is less powerful and hence less expensive and provides less interference with other electronic devices that are affected by RF signals. Moreover, as reply signals from energy holding tags can have extremely low power (e.g. in the range of $1 \times 10^{-12}$ to $1 \times 10^{-14}$ W) and yet be detected from a small distance (also called "detection range"), such as 1 meter, power signals of the type described herein do not interfere with operation of other electronic devices that may use radio frequency signals, such as domestic microwave ovens, domestic jewelry cleaners, and ultrasonic humidifiers (and so eliminate the need to obtain government permits for operation). In addition, use of interrogation units that detect reply signals only within such a detection range reduces interference from similar or identical energy holding tags in neighboring locations that are outside the detection range of the interrogation unit.

BRIEF DESCRIPTION OF THE DRAWINGS

FIGS. 1A and 1B illustrate, in perspective views, two alternative embodiments of a device in the form of a bare die (FIG. 1A), or an encapsulated die (FIG. 1B), wherein the device (also called "energy holding tag") in accordance with the invention, absorbs and holds energy from a power signal over a long time period, and responds by transmitting a reply signal over a shorter time period.

FIG. 2A illustrates, in a high level block diagram, one embodiment of a circuit included in the energy holding tag illustrated in FIGS. 1A and 1B.

DETAILED DESCRIPTION

Figure 2B:
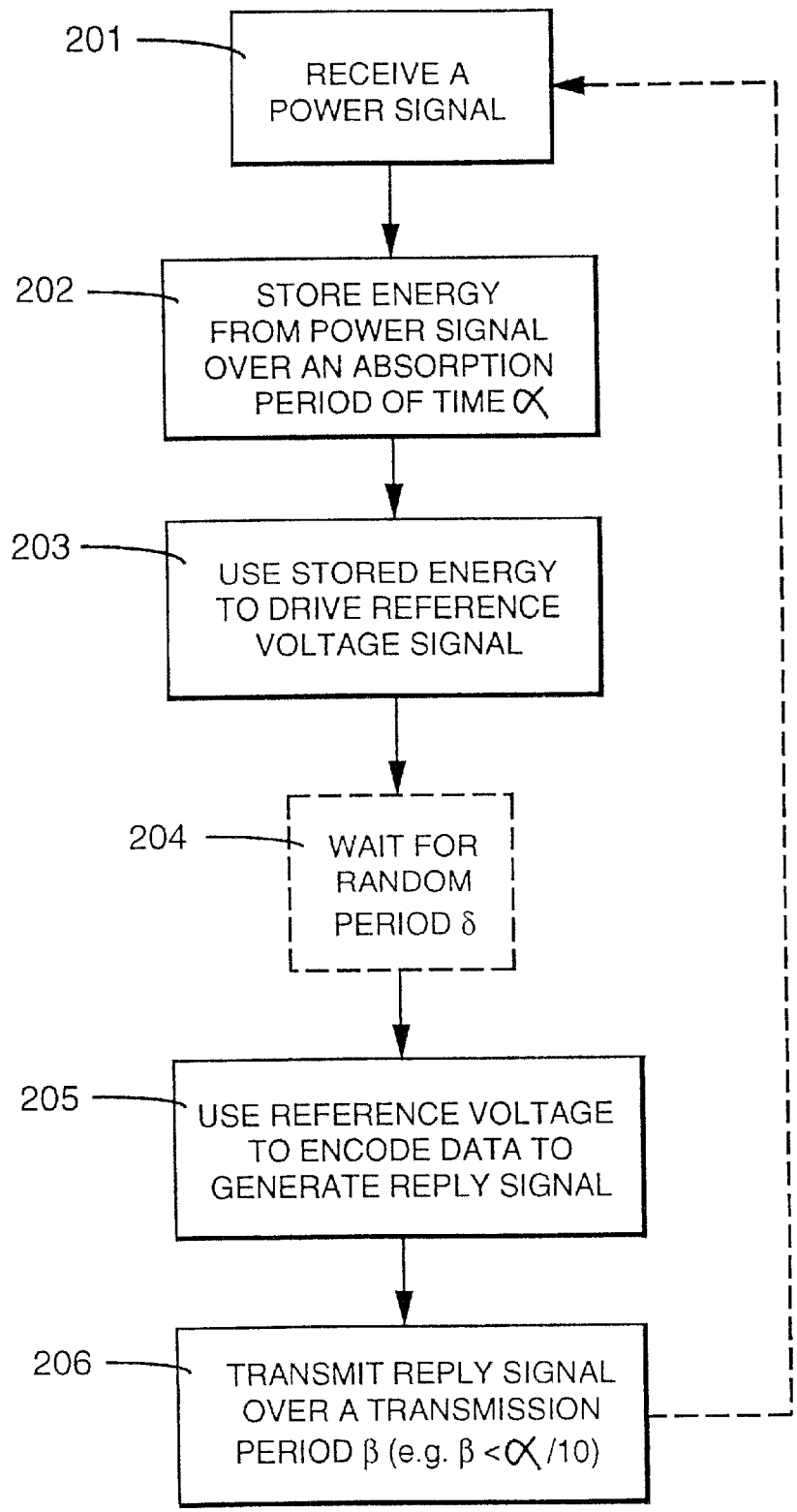
FIG. 2B illustrates, in a flow chart, various acts performed by IC die 100 of FIG. 2A.

A device in accordance with this invention, as described below, absorbs and stores energy over a period of time (also called "absorption period") from a signal (also called "power signal") incident on the device, and transmits a signal, also called "reply signal", using a portion (e.g. 50%) of the stored energy over another period of time (also called "transmission period"). The absorption period is larger, preferably at least an order of magnitude larger, than the transmission period. The device (also called "energy holding tag") uses an energy store, such as a capacitor (also called "energy storage capacitor") that stores energy over an absorption period as described herein. Such a device can reduce costs as compared to prior art devices, if the device transmits a reply signal that is stronger than the power signal, and also stronger than a reflected signal of the prior art.

In one embodiment, an energy holding tag 150 includes an integrated circuit (abbreviated "IC") die 100 (FIG. 1A) that is used as a stand-alone single piece, devoid of most parts conventionally used in packaging (such as die attach adhesive, bond wires, and lead frame). Instead, in one implementation of this embodiment, energy holding tag 150 (FIG. 1B) merely includes a glop 130 (e.g. of epoxy) that covers all sides of integrated circuit die 100. Integrated circuit die 100 communicates with an interrogation unit by a wireless link e.g. via electromagnetic signals that pass through glop 130. Use of just a glop 130 is cheaper than conventional packaging (e.g. using wire bonds and plastic package), and provides a hermetic seal that prevents damage from e.g. humidity. Glop 130 also provides protection from physical forces, as compared to the use of a bare die. Integrated circuit die 100 has a length L of, for example, 50 mils and a width W of, for example, 31 mils.

Instead of glop 130, chip scale packaging can also be used. When chip scale packaging is used, an encapsulant is applied to one (or two) planar surface(s) of a wafer prior to dicing (i.e. the cutting of dice from the wafer). Therefore, in one implementation, the encapsulant seals only surfaces 100A and 100B (FIG. 1A) of IC die 100, and the four sides that are perpendicular to these surfaces remain free of encapsulant.

In an alternative implementation, an energy holding tag is unpackaged, e.g. consists of only bare die 100 (FIG. 1A) that is devoid of any packaging whatsoever. Integrated circuit die 100 has a number of layers 101A, 101B . . . , 101N (where N is the number of layers; not all N layers are illustrated in FIG. 1A), formed of a dielectric material. Layers 101A–1010N are each separated from another by one of layers 102A, . . . , 102M (where M is the number of layers; not all M layers are illustrated in FIG. 1A) formed of a conductive material. Layers 101A–101N and 102A–102M of integrated circuit die 100 together form various portions of a circuit for responding to an incident power signal 110 by transmitting a reply signal 120. In such a bare die 100, surface layers 101A and 101N (both being formed of dielectric material) protect circuitry formed therebetween.

Figure 9:
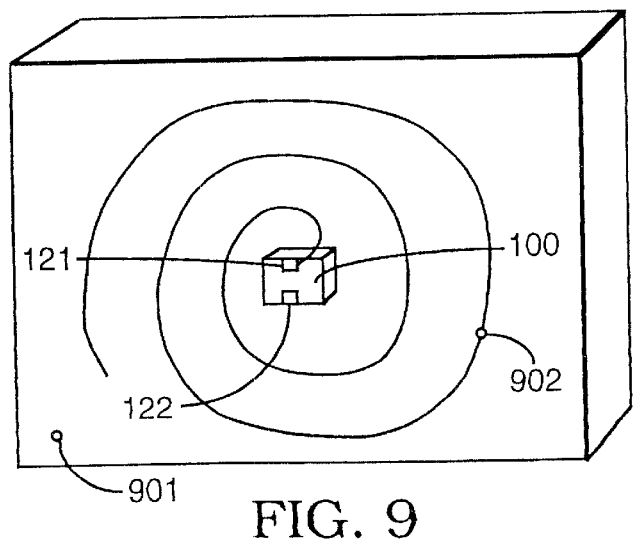
FIG. 9 illustrates an article including a substrate having an antenna, and a device as described herein mounted thereon.

In yet another embodiment, die 100 is packaged in the normal manner, and includes one or two bond pads that are electrically coupled (e.g. by bond wire or electrically conductive adhesive) to an antenna that is discrete and separate from die 100 (as described below in reference to FIG. 9). As used herein, the term "coupled" indicates that one or more additional items may be present between the two items that are described as coupled, while another term "connected" indicates no intervening additional items between the two items being described as connected.

In one specific embodiment, integrated circuit die 100 (FIG. 2A) includes an antenna 160 that receives (as illustrated by act 201 in FIG. 2B) a power signal 110 such as a radio frequency signal having a predetermined frequency (e.g. 2.4 GHz or 900 MHz) that is transmitted by an interrogation unit (not shown in FIG. 2A). Note that antenna 160 can be a separate component in other embodiments, and antenna 160 can be omitted altogether if die 100 is probed by touching. Note also that touching can be used even if die 100 includes an antenna 160, e.g. to provide an alternative way of interrogating die 100, and programming information into die 100. In one example, the 900 MHz frequency used for selecting antenna 160 falls within a frequency band defined by the Federal Communications Commission (FCC) for industrial applications. In another example, a higher frequency (of 2.4 GHz) allows transmission by antenna 160 of a larger amount of data in a shorter time period (as compared to a lower frequency) and is preferred in applications that use the least possible power. The higher the frequency, the higher the antenna gain, since antenna 160 is small enough to fit on die 100 that is, for example, 50 mils×100 mils. Therefore, antenna 160 in a device of one embodiment is a radio frequency antenna tuned to any such predetermined frequency. Antenna 160 generates an electrical signal on an antenna line 211 (FIG. 2A) in response to receipt of the radio frequency signal.

Figure 2C:
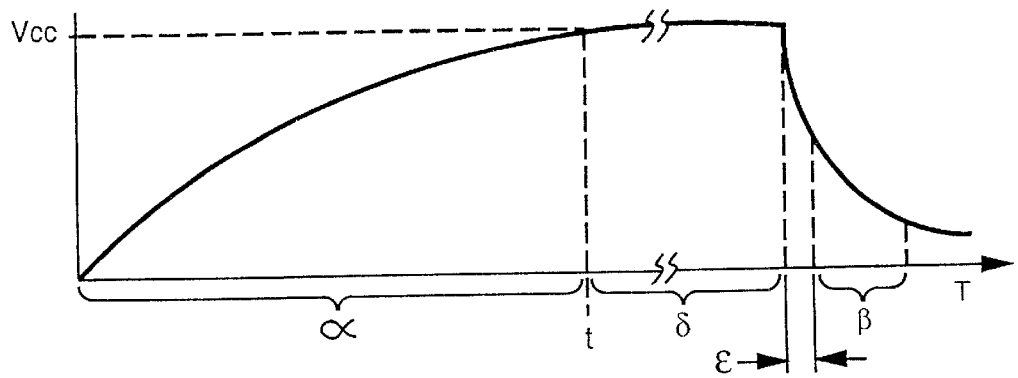
FIG. 2C illustrates, in a graph, variation of voltage potential in the power supply of FIG. 2A from the time a power signal is received to the time a reply signal is transmitted.

A circuit 200 implemented in die 100 includes a power supply 220 that is coupled to antenna 160. Specifically, antenna line 211 is coupled to an input terminal (also called "power input terminal") 221 of power supply 220. Power supply 220 extracts and stores (as illustrated by act 202 in FIG. 2B) energy from the electrical signal at input terminal 221 (FIG. 2A) over a period of time called "absorption period" a (FIG. 2C). At time t, an energy store 224 charges to a reference voltage VCC. Thereafter, power supply 220 (FIG. 2A) supplies (as illustrated by act 203 in FIG. 2B) the stored energy in the form of direct current (abbreviated as "DC") energy at voltage VCC on a power supply line 222. In two alternative embodiments, reference voltage VCC is 1.8 volts and 3.3 volts.

Circuit 200 also includes a signal generator 230 (FIG. 2A) that is coupled to power supply 220. Specifically, signal generator 230 has an input terminal 231 that is coupled to power supply line 222, and an output terminal 232 coupled to antenna line 211. Signal generator 230 responds to a reference voltage signal on power supply line 222 depending on a delay period δ (as illustrated by an optional act 204 in FIG. 2B) implemented in IC die 100. In one implementation there is no delay (i.e. delay period δ is 0), while in another implementation, delay period δ has a random duration in the range of 0 s to 300 ms. In yet another implementation, the delay period δ is predetermined (e.g. fixed), and is implemented, e.g. by masking during fabrication. The predetermined delay is different for each one of a number N of such devices in a set, wherein N is, for example, 15,000.

In one example, all N devices are fabricated on a single wafer, and therefore each device on the wafer has a predetermined delay different from another device on the wafer. In another example, each die 100 is responsive only to a specific "command" signal from an interrogation unit, and use of such selective command signals to activate specific tags improves anticollision, due to the reduced number of dice 100 (e.g. only one die out of 15,000) responding to a given command signal.

If dice 100 are from multiple wafers, then some of dice 100 will have the same delay period δ, even if random delay is used, assuming the seed used to generate the random delay is identical. Collisions occurring due to use of the same delay period δ are detected by interrogation unit 1000 checking for a check sum at the end of data that is being retrieved from reply signal 120. So, when random delay is used, a second reading of a group of dice 100 by an interrogation unit provides mostly the same responses as the first reading, and a few new responses. The new responses are data that was lost in collisions during the first read. The new responses can be distinguished from responses in the first reading by examining all responses as a set. Alternatively, each die in the group of dice 100 may transmit a unique identifier (unique to within 15,000). The probability that the data from the same two or more dice 100 collide in a repeated reading reduces as the square of the single reading probability, and therefore after a third reading, data from all 15,000 dice becomes available.

Signal generator 230 includes a signal transmitter 234 having a reference voltage terminal 251 coupled to line 222 (via terminal 231 ). Signal transmitter 234 also has a signal output terminal 252 that is coupled to antenna line 211 (via terminal 232). Signal transmitter 234 uses (over a "generation" time period ϵ illustrated in FIG. 2C; see act 205 in FIG. 2B) energy from reference voltage terminal 251 to drive an electrical signal encoded with data on signal output terminal 252. As noted above, antenna line 211 is coupled to antenna 160. In response to the signal from terminal 252 on line 211, antenna 160 transmits (see act 205 in FIG. 2B) a reply signal 120 (over a transmission time period β illustrated in FIG. 2C), e.g. a radio frequency signal at the predetermined frequency.

Transmission time period β (FIG. 2B) is smaller (e.g. at least an order of magnitude smaller, preferably several orders of magnitude such as 5 orders of magnitude) than absorption time period α. In one specific implementation, absorption time period α is 500,000 microseconds while the transmission time period β is 4 microseconds (over five orders of magnitude difference). As noted above, signal generator 230 (FIG. 2A) can optionally insert a delay time period δ, e.g. of a random duration, before driving the signal on terminal 232. The maximum delay period δ max added to the transmission time β is hereinafter called window period ω A sum of all the above-described time periods: absorption period, delay period, generation period and transmission period, i.e. $\alpha+\epsilon+\delta+\beta$, determines the maximum speed at which an article that carries integrated circuit die 100 can pass through the detection range of an interrogation unit. In another example, transmission period β is 200 microseconds, and an interrogation unit is responsive for 400 milliseconds (window period ω)), thereby providing 2000 unique transmission periods during which reply signals can arrive.

Signal generator 230 (FIG. 2D) in one embodiment also includes (in addition to signal transmitter 234 described above) a data source 233 having a power terminal 241 that is coupled to power supply line 222 via terminal 231. Data source 233 includes an oscillator (also called "clock oscillator") 243 that receives DC power from power terminal 241 and after stabilization oscillates at a predetermined frequency (e.g. 50 MHz) that is used to generate a clock signal. Data source 233 has a terminal 245 that is coupled by a ready line 235 to signal transmitter 234. Signal transmitter 234 drives a signal active on ready line 235, on detection of the frequency of signal 110. In response to the active signal at terminal 245, data source 233 drives a data signal on a terminal 246 that is coupled to a data input line (also called "serial data line" in one implementation) 237 of signal transmitter 234.

In a first implementation, antenna 160 (FIG. 2D) is formed in die 100, for example, as a planar conductive layer 102A (FIG. 1A). In another embodiment, antenna 160 is formed as a conductive layer 101A over a passivation layer 102A that is in turn formed over various circuits formed in conductive layer 101B. In such an implementation, planar conductive layer 101A acts as a shield for die 100, protecting against electromagnetic interference (EMI). Alternatively, in a second implementation, antenna 160 is formed by a deep trench process well known to a person skilled in the art of integrated circuit manufacturing. Briefly, a deep trench antenna 160 is formed by etching lines with an aspect ratio of 1:1 in a silicon layer, and metallizing the silicon layer with aluminum or titanium to create an antenna 160 having an area three to four times larger than the planar area on conductive layer 102A.

In addition to antenna 160, in this implementation, a capacitor 224C (that implements energy store 224; see FIG. 3) is formed from such a deep trench by forming a dielectric layer (e.g. $SiO_2$) in the trench, over the metalized surface, followed by forming in the trench another metal layer over the dielectric layer. In another embodiment, antenna 160 forms one plate of capacitor 224C, thereby reducing the size of die 100, as compared to forming antenna 160 and capacitor 224C separate and distinct from each other.

In one implementation, the transmission power for antenna 160's reply signal 120 is calculated as follows. Antenna 160 receives power 0.1 $nW/cm^2$ at a distance of 1 m from an interrogation unit that includes an isotropic transmitter. The power generated by the transmitter is 12 $\mu W$. Area of a sphere with a radius of 1 m (100 cm) is $A=4\pi r^2 = 4\pi (100\ cm)^2 = 126 \times 10^3\ cm^2$. This is the $1/r^2$ factor for power reduction: specifically from power at a transmitter to power at die 100. To get transmitter power multiply 0.1 nW/cm times area of $126 \times 10^3\ cm^2$ which equals $12.6 \times 10^{-6}$ W=12.6 $\mu W$. To sustain this transmitter power for 4 $\mu s$, the required energy is 12.6 $\mu W \times 4\ \mu s = 50.3 \times 10^{-12}$ J=50 pJ. Assume that 80% of the stored energy is used to transmit and 20% is used to power up data source 233 and read out the data, then the total energy required is 50 pJ/0.8=63 pJ.

A trade off in different implementation can be made as follows. The higher the storage voltage, the small the required capacitor and the smaller the size of the capacitor. But the higher the voltage the thicker the dielectric must be and the higher the power used to run the logic. For example, assume a reference voltage of 3.3 V and line geometry of 0.7 $\mu m$, then from $E = \frac{1}{2} CV^2$, $$C = \frac{2E}{V^2} = \frac{2 \cdot 63\ pJ}{(3.3\ V)^2} = 11.5\ pF$$

$$C = \varepsilon_0 \kappa \frac{A}{L}$$

Hence, assuming a thickness of 0.5 $\mu m$ $A = CL/\varepsilon_0\kappa = (11.5\ pF \cdot 0.5\ \mu m)/(8.85 \times 10-12\ F/m \cdot 3.3) = 198 \times 10^{-9}\ m^2 = 198 \times 10^{-9}(39.37\ in)^2 = 306 \times 10^{-6}\ in^2 = 306\ (mils)^2 = (17.5\ mils)^2$ If a deep trench process is used, the area can be reduced by a factor of 3× or 4×. Assuming 3×, the area is 102 $(mils)^2$ or $(10.1\ mils)^2$, a very small fraction (e.g. less than one-tenth) of the entire die's area, assumed to be 2,000 $(mils)^2$ as stated above.

The power received at antenna 160 can be calculated as follows: Assume die 100 needs to be powered up in 500 ms. So, 63 pJ of energy needs to be transferred in 500 ms, or power required is 63 pJ/500 ms=126 pW. Assume antenna 160 is 8 mils×42 mils in area, that is 336 $(mils)^2$ or $217 \times 10^3$ $(\mu m)^2 = 2.17 \times 10^{-3}\ cm^2$. So the received power must have been achieved by a power density of 126 $pW/2.17 \times 10^{-3}\ cm^2$ at the antenna. In this example, received power is $58 \times 10^{-9}$ $W/cm^2 = 58\ nW/cm^2$. To achieve this power density at antenna 160, a transmitter would need to be more powerful by the factor $126 \times 10^3$, if the transmitter is isotropic and is detected at a range of 1 meter. Therefore, the transmitter has a power of $7.32 \times 10^{-1}$ W in this particular example.

In one embodiment, the power of a reply signal from die 100 is sufficiently small so as to not interfere with other electronic devices of the type described in the telecommunications CFR §18.107 (such as industrial heating equipment, medical diathermy equipment, ultrasonic equipment, consumer ISM equipment including domestic microwave ovens, jewelry cleaners for home use, and ultrasonic humidifiers).

In one embodiment, power supply 220 (FIG. 3) includes a rectifier 223 that rectifies an alternating current (abbreviated "AC") signal (e.g. the current has a magnitude that oscillates at a frequency in the radio frequency range, e.g. 1000 MHz–5600 MHz) received on input terminal 221. Rectifier 223 supplies a DC signal on a power line 224I of an energy store 224 also included in power supply 220. Specifically, rectifier 223 is coupled to a terminal 229 that is in turn coupled to each of: an energy store 224 and a voltage regulator 226. Energy store 224 has a power line 224I coupled to terminal 229, and regulator 226 has an input line 226I coupled to terminal 229. Regulator 226 provides a reference signal at a voltage VCC on line 222 that is coupled to terminal 231 of signal generator 230 (as described above in reference to FIG. 2D).

In one embodiment, rectifier 223 is implemented by a Schottky diode 223D having an anode coupled to terminal 221, and a cathode coupled (via terminal 229) to energy store 224. Diode 223 has a single pn junction that is fabricated by silicon diffusion in one implementation, as described in "Electron Principles Physics, Models and Circuits" by Paul E. Gray and Campbell L. Searle, John Wiley and Sons, Inc. 1967. During a positive phase of the current, diode 223D becomes forward biased, and passes the voltage from terminal 221 to node 229 (that is coupled to energy store 224). During a negative phase of the current, diode 223D acts as an open switch, by not passing energy therethrough.

Figure 3:
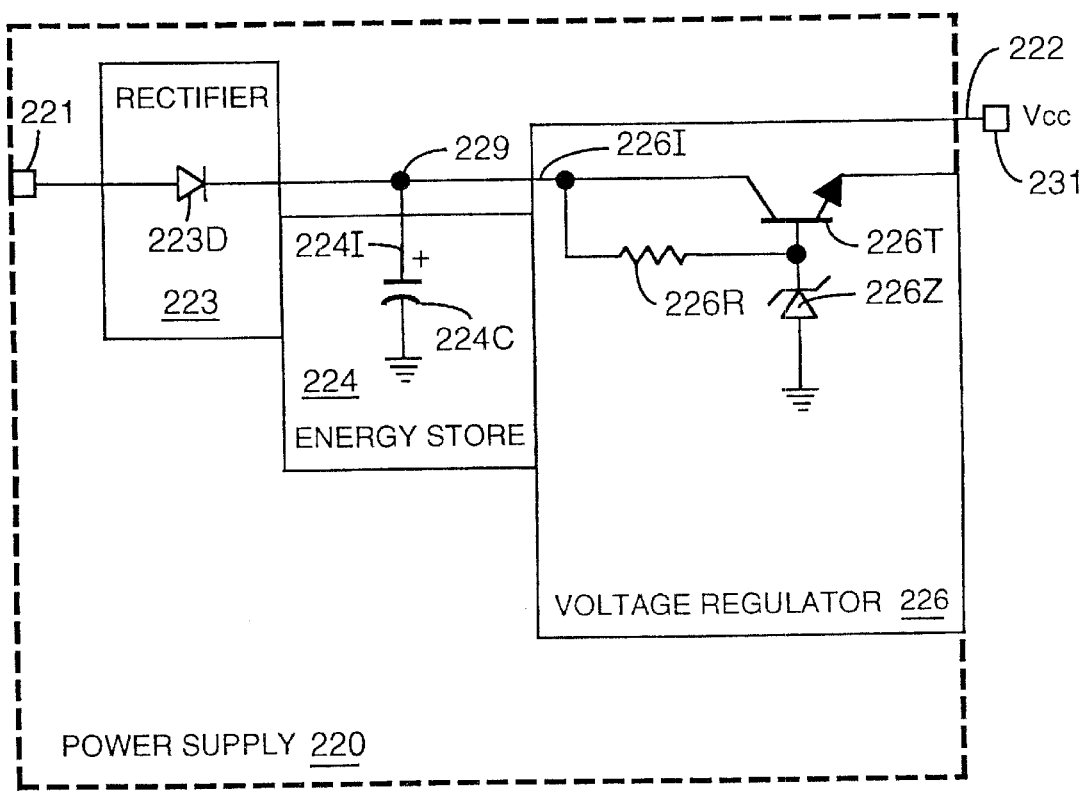
FIG. 3 illustrates, in a circuit diagram, the power supply of FIG. 2C.

Although in the embodiment illustrated in FIG. 3 a single diode 223D is used in power supply 220, a full-wave bridge rectifier (not shown) can be used, e.g. as described in the book "The Art of Electronics," by Paul Horowitz and Winfield Hill, Cambridge University Press, Cambridge Mass., Second Edition 1989, reprinted 1991, that is incorporated by reference herein in its entirety. As rectification of AC energy to DC energy is well known in the art of electrical engineering, any known rectification circuit can be included in power supply 220. For example, instead of diode 223D, a npn transistor can be used with the base coupled to terminal 221, collector coupled to a source of the ground reference and emitter coupled to terminal 229. Similarly, instead of the npn transistor, a pnp transistor can be included, with base coupled to terminal 229, emitter coupled to terminal 221, and collector coupled to ground.

In this embodiment, energy store 224 is implemented by a capacitor 224C having a rating in the range of, e.g. 0.1 to 10 micro farads (in one example 5 micro farads). Specifically capacitor 224C is implemented as a reverse biased diode, with charge stored in the space-charge layer that depends (nonlinearly) on the reverse bias voltage. The voltage applied across capacitor 224C is equal to the peak positive magnitude of the alternating current (discussed above). Power supply line 222 is coupled to the anode of capacitor 224C. Capacitor 224C supplies an electrical signal in the form of a direct current (DC) to signal generator 230 via regulator 226. Also in this embodiment, regulator 226 is implemented by a npn transistor 226 T having a collector coupled to terminal 229 and an emitter to line 222. Transistor 226T has a base coupled to a cathode of a zener diode 226Z, and also to one end of a resistor 226R. The other end of resistor 226R is coupled to the collector of transistor 226T.

During operation, transistor 226 acts as a common emitter amplifier, with a zener diode 226Z acting as a voltage source at the base of transistor 226T. Zener diode 226Z is operated in reverse breakdown (avalanche) region, and develops a steady voltage e.g. 0.7 volts that forward biases npn transistor 226T through bias resistor 226R. That is, when diode 226Z is reverse biased, a steady state voltage is produced at the base of transistor 226T. Specifically, in one example, diode 226Z breaks down in the range of 6–9 volts. Therefore, output voltage VCC on line 222 (FIG. 2D) is set by diode 226Z, and the just-described range is used for implementing the circuitry in silicon using CMOS technology.

Therefore, diode 226Z generates a stable voltage of, e.g. 8 volts at the base of transistor 226T. Resistor 226R is a current limiting resistor that, with varying radio frequency (RF) amplitudes limits the maximum current drawn by transistor 226T. Transistor 226T uses the stable voltage as a reference to produce the voltage VCC at terminal 222. So, in this particular embodiment, transistor 226 acts as a series voltage regulator. Therefore, when capacitor 224C is charged, i.e. after absorption period a (FIG. 2B), zener diode 226Z (that is coupled to the base of transistor 226T) operates in the avalanche mode and thus turns on transistor 226T.

In one example of this embodiment, antenna 160 transmits reply signal 120 at a power of 12.6 mW so that reply signal 120 has a power of 0.1 nW/cm at a distance 1 m from integrated circuit die 100. To sustain a power of 12.6 mW for 4 µs, capacitor 224C stores energy used for transmission (hereinafter "transmission energy") of 50 pJ. In this example, capacitor 224 also stores energy (hereinafter "operational energy") of 13 pJ used by data source 233 and signal transmitter 234 to generate the electrical signal on signal output terminal 232. Therefore, in this specific example, capacitor 224 holds 80% transmission energy and 20% operational energy. Other ratios of transmission and operational energy can be stored in other embodiments as appropriate.

In this example, capacitor 224C (FIG. 3) supplies DC energy at reference voltage VCC of 3.3 volts, and is formed as a flat plate capacitor in die 100, with two conductive layers, each of area 306 mils$^2$ and each separated from the other by a 0.5 µm thick dielectric layer of $SiO_2$. Alternatively, capacitor 224 can be formed in an area of 102 mils$^2$, as a deep trench. In this example, antenna 160 has an area of 8 mils×42 mils and receives a total energy of 63 pJ from a power signal 110 of power 126 pW in an absorption period α of 500 ms. Power signal 110 is transmitted at a distance of 1 m by an isotropic transmitter (not shown) with a power of $7.32 \times 10^{-3}$ W.

Figure 2D:
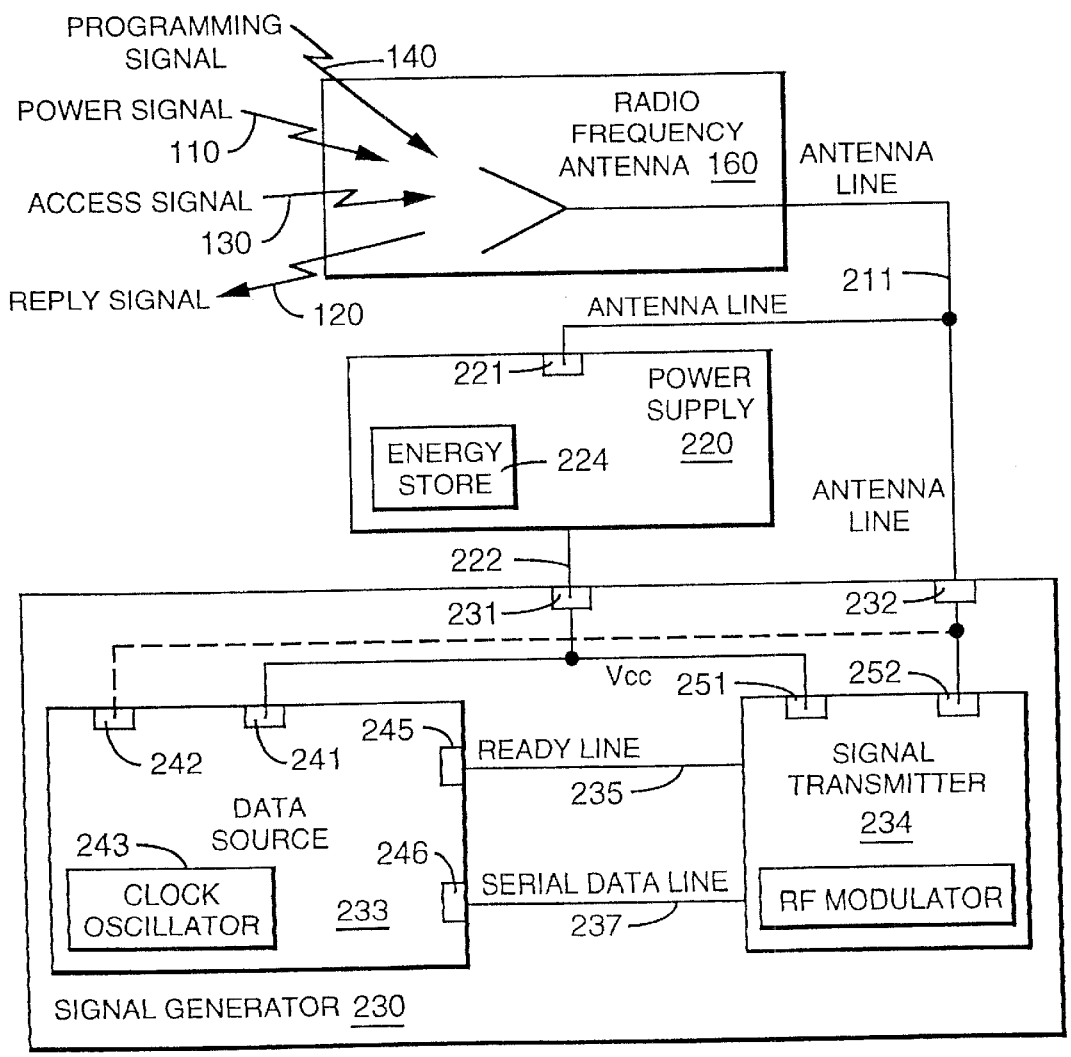
FIG. 2D illustrates, in a detailed block diagram, parts of the energy holding tag illustrated in FIG. 2A.

In one embodiment, signal transmitter 234 (FIG. 4) is locked in frequency to power signal 110 (FIG. 2D). Frequency detector 410 causes voltage controlled oscillator 420 to generate a signal oscillating at a frequency identical to the frequency of power signal 110 using phase locked loop techniques well known to the skilled electrical engineer. Voltage controlled oscillator 420 passes the oscillating signal via line 422 to radio frequency modulator 430 that responds to a serial data signal on line 237 by controlling phase and amplitude of the signal on line 422 to produce a modulated signal for transmission by antenna 160.

Signal transmitter 234 also includes a switch 440 that has a first terminal 441 coupled to an output terminal (also called "signal output terminal) 252 that is in turn coupled via signal output terminal 232 (described above) to antenna line 211 (FIG. 2D). Switch 440 couples first terminal 441 to one of second terminal 442 and third terminal 443, depending on a control signal received at a fourth terminal 444. Second terminal 442 is coupled to an input line 414 of frequency detector 410, while third terminal 443 is coupled to an output line 431 of radio frequency modulator 430. Fourth terminal 444 is coupled to ready line 235 that is also coupled to a switch control line 416 of frequency detector 410.

Initially, on power-up, the signal on ready line 235 is inactive, switch 440 couples second terminal 442 to first terminal 441, and signals on lines 415, 422 and 431 are inactive. Frequency detector 410 initially receives a signal from antenna line 211 on input line 414, when antenna 160 receives power signal 110. In response to the signal on input line 414, frequency detector 410 determines the frequency of power signal 110, and drives a signal active on switch control line 416, and simultaneously drives a voltage signal on a frequency output line 415. Frequency output line 415 is coupled to an input terminal 421 of a voltage controlled oscillator 420. In response to the voltage signal on input terminal 421, oscillator 420 supplies the above-described modulation signal on an output line 422 that is coupled to an input terminal 432 of radio frequency modulator 430.

As noted above, switch control line 416 is coupled to fourth terminal 444 of switch 440, and therefore when frequency detector 410 detects the frequency of power signal 110, switch 440 operates to couple terminal 441 to terminal 443 instead of to terminal 442. Therefore, the signal provided on line 431 by radio frequency modulator 430 passes through switch 440 to antenna line 211 (FIG. 2D), via terminals 232 and 252. As noted above, antenna 220 transmits reply signal 120 in response to the signal on antenna line 211. Each of switch 440, frequency detector 410, oscillator 420 and modulator 430 are coupled to, and draw power from terminal 251 (also called "reference voltage terminal") that receives the reference signal at voltage VCC as discussed above.

In one example, switch 440 is a single pole double throw switch implemented as a portion of die 100, but otherwise similar or identical to a discrete electronic component MRFIC0903 described in MOTOROLA Semiconductor Technical Data sheet MRFIC0903, entitled "The MRFIC Line Broadband GaAs Switch," published 1988, in MOTOROLA Handbook, Reference A, entitled "Wireless Semiconductor Solutions" Device Data, Vol. 1, DL110.D, Rev. 9 page 2.2–7, available from MOTOROLA Literature Center, P.O. Box 5405, Denver, Colo. 80217 that is incorporated by reference herein in its entirety.

In this embodiment, oscillator 420 generates on line 422 a signal having a frequency that is directly proportional to the voltage of a signal at terminal 421. In this example, oscillator 420 is also implemented as a portion of die 100, but is otherwise similar or identical to a discrete electronic component VTO-8150 described in Hewlett Packard Technical Data sheet entitled VTO-8150, published 1997, in Hewlett Packard Catalog "Communications Components Designers Catalog," 5966-0895E, available from the Internet at www.hp.com/go/components that is incorporated by reference herein in its entirety.

Also, in this embodiment, modulator 430 contains circuits that drive on line 431, a signal having 90 degree (quadrature) phase changes from the signal at terminal 432 in response to an active signal at terminal 433 (that is coupled to serial data line 237), and otherwise 0 degree phase change (i.e. in response to an inactive signal on terminal 433). In the particular example described above, modulator 430 is implemented as a portion of die 100, but otherwise similar or identical to a discrete electronic component RF-2422 described in RF Micro-Devices Technical Data sheet entitled "2.5 GHz DIRECT QUADRATURE MODULATOR", available from RF Micro devices, Inc., 7625 Thorndike Road, Greensboro, N.C. 27409 that is incorporated by reference herein in its entirety.

In one particular embodiment, frequency detector 410 includes an amplifier 411 coupled between lines 414 and 412I, a prescaler 412 coupled between lines 412I and 413I, and a frequency synthesizer 413 that is coupled between lines 413I and 415. Amplifier 411 amplifies the signal from antenna 160. Specifically, amplifier 411 increases (e.g. by a factor of 10) the voltage applied to line 411 during a power-up phase, when switch 440 couples second terminal 442 to first terminal 441 as described above. Prescaler 412 in turn electronically divides, by a fixed divisor (e.g. in the range of 256 to 512) the frequency of the signal provided by amplifier 411. In one implementation, the fixed divisor is 256.

Frequency synthesizer 413 provides a signal on line 415 to lock oscillator 420, specifically to cause oscillator 420 to generate on line 422 a signal of the same frequency and same phase as the frequency and phase of the signal received on antenna line 411. Synthesizer 413 also drives a signal active on line 416 when the frequency signal is locked. Synthesizer 413 contains "sample and hold" circuits (well known to the skilled electrical engineer) that cause stabilizing of the voltage of a signal being provided on line 415 for up to, e.g. 1,000 μs. Each of amplifier 411, prescaler 412 and synthesizer 413 are coupled to terminal 251 (that provides a reference signal at voltage VCC as discussed above).

Use of the same frequency in reply signal 120 as the frequency of power signal 110 allows an interrogation unit to have a very narrow bandwidth, and therefore very low noise, as compared to an interrogation unit that is required for communicating with a die 100 that merely uses a free running oscillator to generate reply signal 120. Specifically, when a free running oscillator is used (which may be necessary if there is insufficient space on die 100 to accommodate the above-described frequency synthesizer 413), the frequency of signal transmitter 234 is not known over a range, and the interrogation unit must accept the entire possible range of frequency, and such an interrogation unit accepts a large amount of noise from sources other than dice 100. The reduction of noise by use of frequency synthesizer 413 as described herein reduces the amount of power to be transmitted in reply signal 120, as compared to use of the free running oscillator.

In the above-described example, amplifier 411 is implemented as a portion of die 100, but otherwise similar or identical to a discrete electronic component MSA-0300 described in Hewlett Packard Technical Data sheet entitled "Cascadable Silicon Bipolar MMIC Amplifier" that is incorporated by reference herein in its entirety. Also, in this example, prescaler 412 is implemented as a portion of die 100, but otherwise similar or identical to a discrete electronic component MC-12079 described in MOTOROLA Technical Data sheet entitled "2.8 GHz Prescaler", that is incorporated by reference herein in its entirety.

Also, in this example, frequency synthesizer 413 is implemented as a portion of die 100, but otherwise similar or identical to a discrete electronic component MC-12179 described in MOTOROLA Technical Data sheet entitled "500–2800 MHz Single Channel Frequency Synthesizer" that is incorporated by reference herein in its entirety.

Lines 422 and 431 are conductive lines, each line having an impedance of, e.g. 50 ohms and carrying an electrical signal oscillating at a frequency in the radio frequency range, e.g. range of 2.3 to 2.5 GHz. Lines 422, 431 and other such lines have dimensions that are apparent to an electrical engineer skilled in the design of radio frequency components, in view of the disclosure. For examples of impedance matching striplines (such as tapered lines and quarter wavelength transformers), see the book Lines, Waves and Antennas by Brown, Sharpe and Hughes, The Ronald Press C, 1961 that is incorporated by reference herein in its entirety. One example of such a line is a 50 ohm microstrip transmission line implemented in a single integrated circuit die formed of dielectric having a dielectric constant of 4.8 and a thickness of 0.064 inch.

Figure 4:
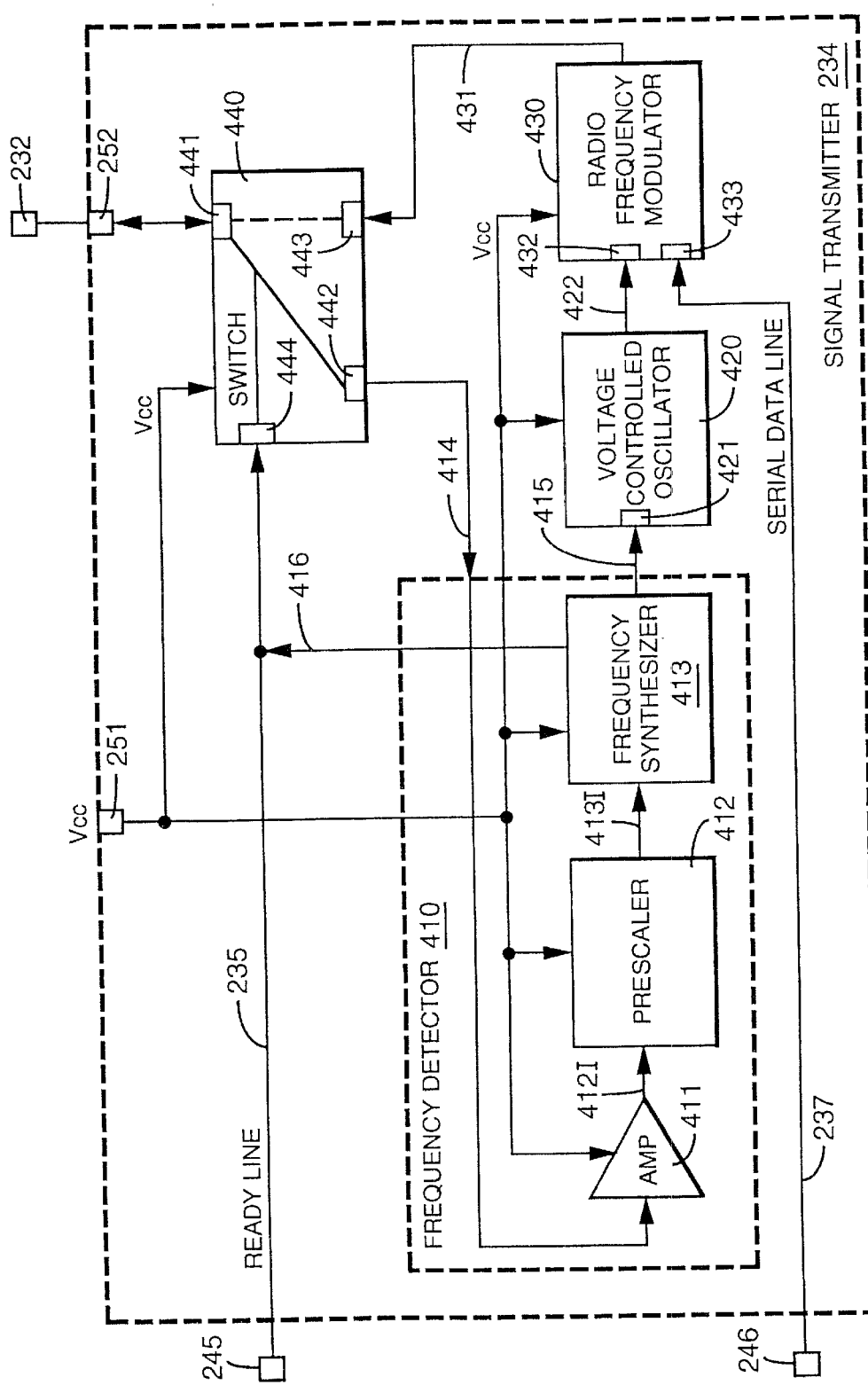
FIG. 4 illustrates, in a circuit diagram, the signal transmitter of FIG. 2C.

Other components not shown in FIG. 4 are normal interconnect lines required for operation of a phase lock loop circuit, and are known to the skilled electrical engineer. For example, lines 414–416, 235 and 237 (FIG. 4) are all conductive lines that carry direct current in the normal manner in an integrated circuit die. Various modification and adaptations of circuitry of the type discussed herein in reference to signal transmitter 234 (FIG. 2D) are apparent to the skilled electrical engineer, e.g. as described in the book entitled "Microwave Circuit Design Using Linear and Non-linear Techniques" by George D. Vendelin, A. M. Pavio and U. L. Rohde, Wiley and Sons, New York, N.Y., 1992.

Figure 5A:
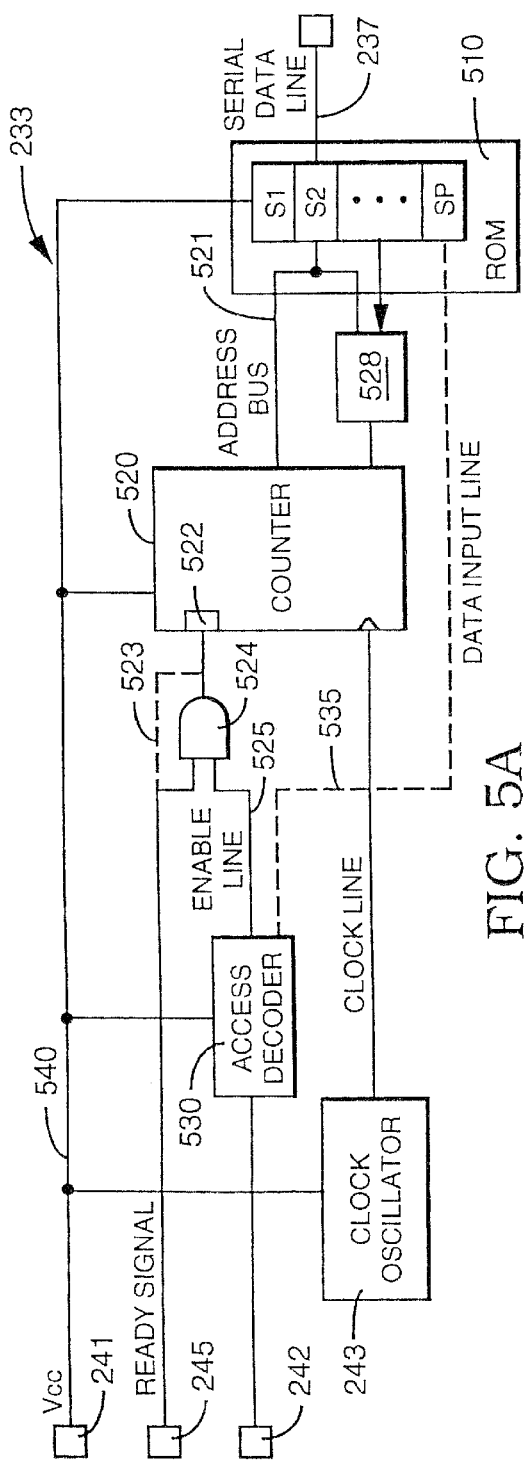
FIGS. 5A and 5C illustrate, in a circuit diagram, the data source of FIG. 4 in three embodiments.

In one embodiment, data source 233 (FIG. 5A) includes a non-volatile memory, such as a read only memory (ROM) 510 having a number of storage elements S1, S2 . . . SN . . . SP (where $1 \leq N \leq P$, and not all P storage elements are illustrated in FIG. 5A) that hold the data (e.g. an identification number) to be supplied on serial data line 237. Data source 233 also includes a counter 520 coupled to ROM 510 by an address bus 521. During operation, counter 520 supplies the address signal of each storage element SN sequentially on address bus 521 at each consecutive clock cycle so that ROM 510 supplies data from storage elements S1–SP serially on serial data line 237. Counter 520 starts generation of address signals in response to an active signal on an enable terminal 522. Ready terminal 245 (described above) is coupled to enable terminal 522 either directly by a line 523 (shown dotted in FIG. SA), or through an AND gate 524. AND gate 524 is also connected to an enable line 525 of an access decoder 530 that is optionally included in data source 233.

Access decoder 530 is responsive to a signal driven by antenna 160 (FIG. 2C) on an input terminal 242 that is connected to antenna line 211. Antenna 160 drives a signal on terminal 242 in response to another radio frequency signal (hereinafter "access signal") 130. In one embodiment, access signal 130 has a frequency different from the predetermined frequency of power signal 110 (and antenna 160 performs "frequency hopping" in a spread spectrum manner well known to the skilled electrical engineer), while in another embodiment power signal 10 includes access signal 130. Access decoder 530 compares data encoded in the signal on input terminal 242 with a key and drives a signal active on enable line 525 when the data and the key are identical. AND gate 524, enable line 525, access decoder 530 and input terminal 242 are optional parts that are omitted in one embodiment.

In one particular embodiment, instead of address bus 521 directly coupled between counter 520 and ROM 510, data source 233 includes a random delay circuit 528 coupled between counter 520 and ROM 510. Random delay circuit 528 passes the address signal from counter 520 after a delay period to ROM 510. Random delay circuit 528 determines the duration of the delay period using a random number generator (not shown in FIG. 5A) included in random delay circuit 528, and uses a portion of the data stored in ROM 510 as a seed to the random number generator. For example, if P=1500 bits, random delay circuit 528 can read ten bits located at a predetermined offset, e.g. bits in storage locations S11–S20 (not shown in FIG. 5A) and use values of the ten bits in the random number generator to create a delay period in the range of, for example, 0 s and 300 ms. Therefore, once data is stored in ROM 510, random delay circuit 528 introduces a delay period δ that is random prior to transmission of reply signal 120 (FIG. 2A).

Even if the data stored in ROM 510 is identical in two different bare dice 100, variations in the manufacturing process of bare dice 100 result in the two bare dice 100 transmitting the respective reply signals 120 at different times. For example, two bare dice 100 can be different due to variations in temperature, manufacturing threshold for oscillator 239 (FIG. 2C) and the time at which each one of bare dice 100 is powered up and reaches the threshold energy storage voltage. Moreover, in one particular variant of this embodiment, random delay circuit 528 includes a ROM (not shown) containing an offset number to be used in determining the storage locations in ROM 510 from which the seed is to be used in the random number generator.

In one particular embodiment, random delay circuit 528 introduces the delay period by counting up to the number read from ROM 510. For example, if the storage locations S11–S20 described above contain the value 53, random delay circuit 528 counts up to 53, thereby to introduce 53 clock cycles of delay into the supply of address signals to ROM 510 that in turn causes the same delay in the supply of a data signal on line 237. In this particular embodiment, random delay circuit 528 includes a memory addressing circuit that changes a pointer (in ROM 510) used to select bits at the storage locations, e.g. S11–S20. Although random delay circuit 528 is illustrated as being separate from counter 520, in another embodiment, random delay circuit 528 includes counter 520 and generates the address signals on address bus 521.

Figure 5B:
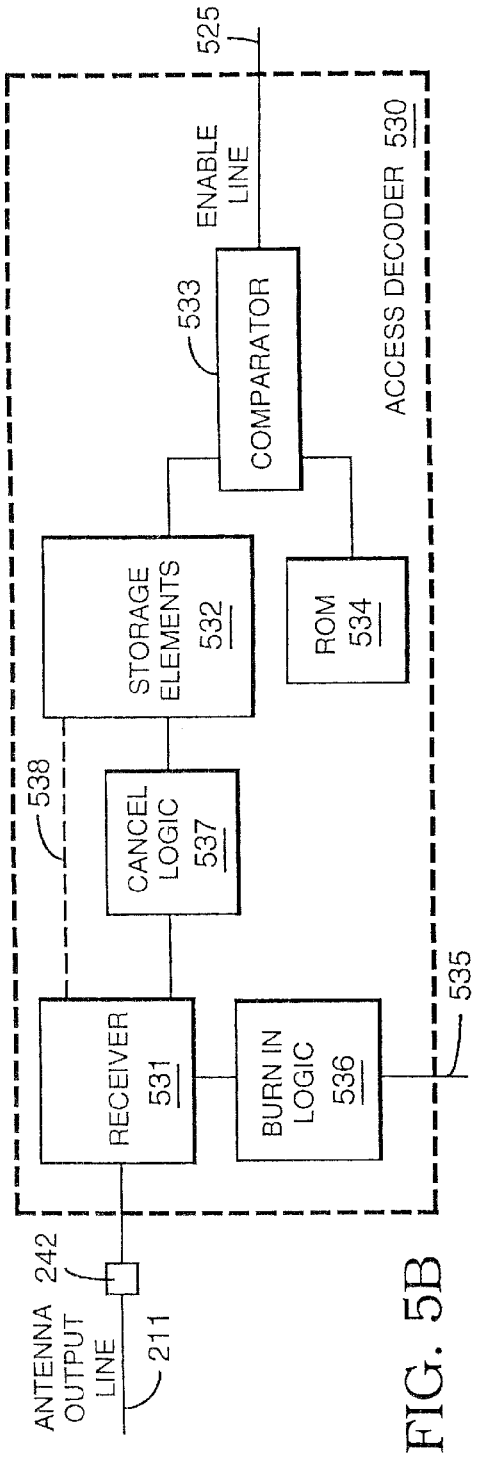
FIG. 5B illustrates, in a circuit diagram, the access decoder of FIG. 5A.

In one variant of the above-described embodiment, access decoder 530 includes a receiver 531 coupled to input terminal 242, and storage elements 532 coupled to receiver 531 by a line 538 (shown dotted in FIG. 5B). Storage elements 532 store data from access signal 130 (FIG. 2C). Access decoder 530 (FIG. 5B) also includes a read only memory (ROM) 534 in which is encoded a predetermined password, and a comparator 533 coupled to ROM 534 and to storage elements 532. The password in ROM 534 can also be stored by masking during fabrication of integrated circuit die 100. Comparator 533 compares the password from ROM 534 with data in storage elements 532, and drives a signal active on enable line 525 in case of a match.

Circuitry for implementing all blocks in FIG. 5A, e.g. access decoder 530 (including receiver 531, storage elements 532, comparator 533 and ROM 534), clock oscillator 243, counter 520, and random delay circuit 528 would be apparent to the skilled electrical engineer in view of the disclosure. Such an engineer may use, e.g. a Verilog synthesizer to design such circuitry. In the above-described embodiment, data source 233 includes a power supply line 540 (FIG. 5A) that couples power supply terminal 241 to ROM 510 and counter 520.

A password of the type described above can be used to selectively query one or more tags of the type described herein. For example, in a group of tags (also called "light fixture tags"), each recognizes the same password, and each tag is mounted on a light fixture, such as a table lamp or a ceiling lamp. Therefore, in response to a power signal 110 carrying a password for light fixture tags, only the light fixture tags generate reply signals 120. That is, any other tags present in the same location (e.g. a tag mounted on a brief case and a tag mounted on a personal computer, or a tag mounted on a file) do not respond (because the password is not recognized).

So, in one embodiment, an interrogation unit 1000 generates a power signal 110 carrying a password, and is used to determine the number of light fixture tags in a room (by counting the number of reply signals 120). The counting of light fixture tags can be repeated a few times, in case of collisions, until an accurate count is obtained. For example, the counting is repeated twice when the number of light fixture tags is 1% of the following number, the window period ω, divided by the transmission period β (i.e. double the number of repetitions).

Data in ROM 510 can also be stored by masking during fabrication of integrated circuit die 100. Alternatively, access decoder 530 can have an optional data input line 535 (FIG. 5A) connected to ROM 510, for storing the data into ROM 510. When powered up for the first time, access decoder 530 is in a state called "receive only" and drives on data input line 535 a signal extracted from a programming signal 140 (FIG. 2C), thereby to store in storage elements S1–SP the extracted signal. In this embodiment, ROM 510 (FIG. 5A) is an electrically erasable programmable read only memory (EEPROM). In the embodiment illustrated in FIG. 5A, a number of storage elements SN–SP are used to hold a checksum for the data stored in storage elements S1–SN–1, thereby to allow an interrogation unit (not shown in FIG. 5A) to confirm that the data in storage elements S1–SP was read correctly.

Specifically, in one embodiment, access decoder 530 includes a burn in logic 536 coupled between receiver 531 and data input line 535. When powered up for the first time, receiver 531 of one variant drives a signal to burn in logic 536 rather than to storage elements 532. In response to the signal, burn in logic 536 implements a "first write" process as follows. Specifically, burn in logic 536 "burns in" data from programming signal 140, e.g. by applying short bursts of energy to storage elements in ROM 510 thereby to vaporize lines leading to some of storage elements S1–SP depending on the data being programmed. Such a programmable ROM 510 is useful for example to add routing information to a package being mailed. In the variant described above, when the last of the data has been sent to ROM 510, burn in logic 536 self destructs, e.g. by vaporizing the line coupled to receiver 531. The next time access decoder 530 is activated (e.g. on receipt of power signal 110) receiver 531 drives a signal to storage elements 532 instead of to burn in logic 536.

In another embodiment, receiver 531 is coupled through a cancel logic 537 to storage elements 532 (instead of the above-described line 538). On receipt of a cancel signal 150 (identical to programming signal 140 of FIG. 2C except for carrying a predetermined code), cancel logic 537 self destructs, thereby to prevent access decoder 531 from driving a signal on enable line 525. Therefore, after transmission of cancel signal 150, integrated circuit die 100 cannot respond with a reply signal (i.e. die 100 is effectively destroyed). Cancel logic 537 can be built by using a fuse at the rectifying diode that responds to continuous (e.g. several seconds) of input power at a higher level than a normal read or write cycle, as would be apparent to a skilled electrical engineer based on the disclosure. Alternatively, cancel logic 537 can scramble the password stored in ROM 534 (e.g. by storing "0" as the new password) to achieve the same result.

Figure 5C:
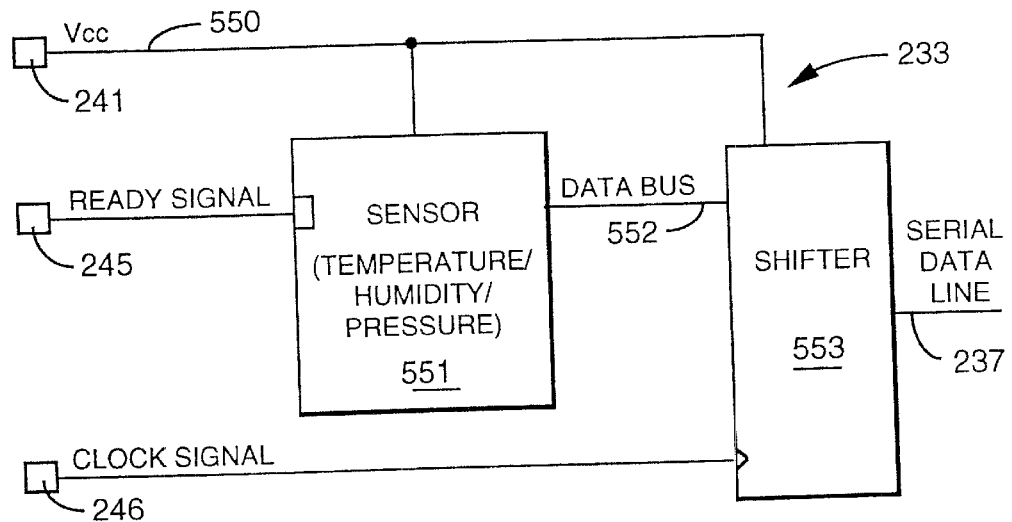
Figure 5D:
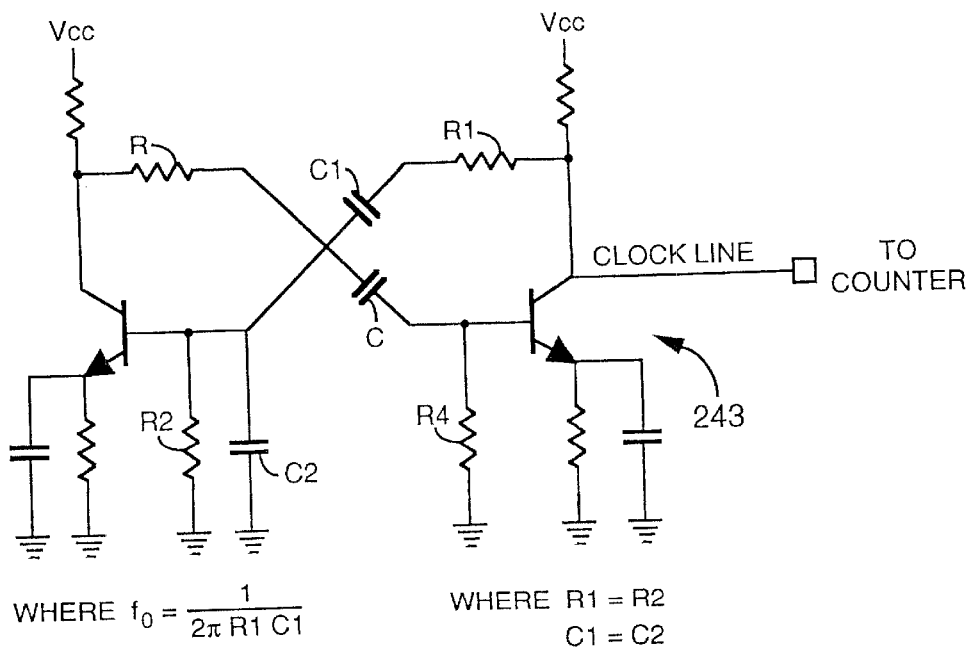
FIG. 5D illustrates the oscillator of FIG. 2C.

In still another embodiment, data source 233 includes a sensor 551 (FIG. 5C) that draws power from a power supply line 550 and responds to ready signal on terminal line 245 by sampling an environmental parameter such as humidity, pressure or temperature and supplies a data signal encoded with a value of the sampled parameter on data bus 552. In this embodiment, data bus 552 is coupled to a shifter 553 also included in data source 233. Shifter 553 converts parallel data signals from data bus 552 into a serial data signal and passes the serial data signal onto serial data line 237. Circuitry for such a shifter is well known to the skilled electrical engineer. As discussed above, amplifier 238 uses the data signal on line 237 to supply a modulated signal for transmission by antenna 160.

Sensor 551 can be, for example, any thermistor for sensing temperature, a micro-electromechanical systems (MEMS) pressure transducer for sensing pressure, or a MEMS humidity sensor for sensing humidity, all of which can be formed in die 100 in a manner apparent to the skilled electrical engineer in view of the disclosure. See, for example, "For I/O, MEMS the word", Electronic Engineering Times, Nov. 13, 1995, pages 53 and 58 that is incorporated by reference herein in its entirety. For temperature sensors, see U.S. Pat. No. 3,940,760 granted to Brokaw, U.S. Pat. No. 4,123,698 granted to Timko, U.S. Pat. No. 5,388,134 granted to Douglass et al., and U.S. Pat. No. 5,619,430 granted to Nolan et al., all of which are incorporated by reference herein in their entirety. For pressure sensors, vibration sensors and accelerometers, see U.S. Pat. No. 5,719,069 granted to Sparks that is also incorporated by reference herein in its entirety.

A integrated circuit die 100 having sensor 551 can include a calibration device for calibrating sensor 551. Sensor 551 can be powered by vibration or other motion, and use the power to make a measurement of the parameter to be sensed, and store the sensed measurement in a memory included in integrated circuit die 100. Moreover, a very thin MEMs beam (e.g. 1 micron thick, 10 microns wide and 50 microns long) can be fabricated that generates electromagnetic interference (abbreviated as "EMI") to power up energy storage capacitor 224 sufficiently for sensor 551 to take the measurement, as would be apparent to the skilled electrical engineer in view of the disclosure. Also, such very thin MEMs beam, if made of a very hard material (e.g. silicon dioxide or boron) can be made to oscillate at ultrasonic frequencies (by an ultrasonic source in the interrogation unit), and used as a frequency stabilizer for a local oscillator (used in place of frequency synthesizer 413) that generates an oscillating voltage signal used in generation of reply signal 120. As oscillation of the MEMs beam at such ultrasonic frequency is independent of the temperature and is time stable, reply signal 120 can be detected within a narrow frequency range, thereby reducing noise.

Dice 100, each having a sensor 551, can be embedded into buildings, vehicles, transported goods, dispersed into forests or on personal effects, and could be used to gather information such as structural information on buildings, vehicles and earth, movement information on packages, warehouses, libraries, people and animals, weather information on land, sea and air, or growth information on forests, agriculture and marine data as would be obvious to the skilled electrical engineer in view of the disclosure. In one such example, a die 100 uses one or more sensors 551 to record in an electrically erasable programmable read only memory (EEPROM) included in die 100 information on certain predetermined events that occur to the object carrying die 100, such as a shock pressure caused by dropping the object, and the recorded information (e.g. magnitude of the shock pressure) is sent in reply signal 120 when the device is interrogated by an interrogation unit. Die 100 uses electrical power generated by the above-described MEMs from vibration during the shock pressure to provide the reference voltage signal necessary for recording the information in the EEPROM.

Note that instead of EEPROM described above, other non-volatile memory can also be used in other embodiments. The non-volatile memory can be of several types: (1) a read/write memory that is used to record information (as described above), and changed many times, (2) a write once, read many (abbreviated as WORM) memory that can be written into just once, and read many times, or a (3) read only memory (ROM) that is hardwritten (e.g. during manufacturing). For example, the WORM when used to hold the mailing address is written just once, and is interrogated many times along a trip to the destination indicated by the mailing address. In another example, the ROM is used for holding information collected during the trip, e.g. the pressure when the object is dropped, or the intermediate routing locations through which the object has traveled so far. A die 100 can include two or more such memories that are all used in different ways.

A collection of such information that is stored in a memory of die 100 over a period of time is hereinafter referred to as a "resume." Such a resume memory can include fields for various information, such as when the object was made, when die 100 was attached to the object, when the object was first shipped from the factory, who the manufacturer of the object is, where the object was warehoused, who the retailer is, when the object was sold, who the customer is, when the object was returned for repairs, what repairs were made on the object, and who repaired the object. In addition, die 100 can have a memory for configuration information, such as MSDS data, use instructions, repair information, parts list, and disposal instructions (in case of hazardous materials such as a battery).

In one embodiment, integrated circuit die 100 is formed of two conductive layers 102A and 102M (FIG. 1A) that are sandwiched between three dielectric layers 101A, 101B and 101N. Conductive layer 102A has a rectangular conductive region 610 of length L1 and width W1. In one example, length L1=L−2D and width W1=W−2D where D denotes the width of scribe and break regions surrounding conductive region 610. In one particular example, L=50 mils, W=31 mils and D=4 mils. Region 610 functions both as an antenna 160 and also in conjunction with conductive layer 102M functions as a capacitor 224 as would be apparent to the skilled electrical engineer. Conductive layer 102M includes a ROM region 611 for ROMs 510 and 534, a power supply region 612 for power supply 220, a logic region 613 for data source 233 and a transmit region 614 for signal transmitter 234. Conductive layer 102M also includes a buffer region 615 that is used to isolate logic region 613 from RF region 614. RF region 614 contains various RF circuitry including e.g. signal transmitter 234.

Figure 6:
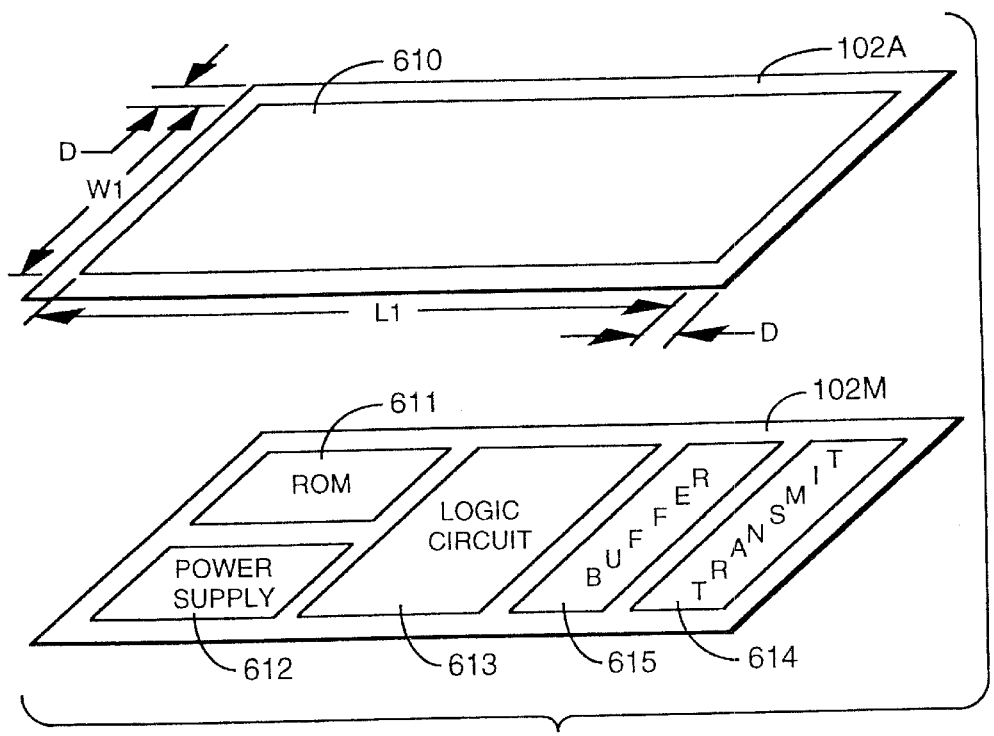
FIGS. 6 and 7 illustrate the layout of conductive layers formed in two embodiments of the bare die of FIG. 1A.

In one example, ROM 150 stores 1500 bits (i.e. N=1500) and occupies an area of 22.5 mils$^2$ in ROM region 611 (FIG. 6). This example assumes a die size of 15×10$^3$ mils$^2$ for a 1 Mbit memory using a 0.7 $\mu$m geometry i.e. 66.7 bits/(mils)$^2$ storage capacity per unit area. In this example, in addition to ROM 510, data source 233 has various logic components such as access decoder 530, counter 520 and associated logic gate 524, all of which occupy an area of 400 mils$^2$ in logic region 613.

Therefore integrated circuit die 100 of this example has a useable area of 1060 mils$^2$ (with 102 mils$^2$ for a capacitor in region 610, 336 mils$^2$ for antenna 160 in region 610, 22 mils$^2$ for ROM 510 in ROM region 611, 400 mils$^2$ for logic components in logic region 613 and 200 mils$^2$ for signal transmitter 234 in transmit region 614). Note that amplifiers 238 and 247 (FIG. 4A) are very small (e.g. a few—such as 8–10—transistors, and a few passive components), and oscillator 239 (FIG. 4A) are also very small, and are not shown in FIG. 6A. If a dead space 4 mils wide is used for scribe and break regions, the total area of die 100 of this example is 1550 mils$^2$ (with a length of 50 mils and width of 31 mils). In this specific example, a 6-inch diameter wafer with 0.7 mm geometry forms a total of 16,400 IC die of the type described herein, using a 90% area utilization factor.

Figure 7:
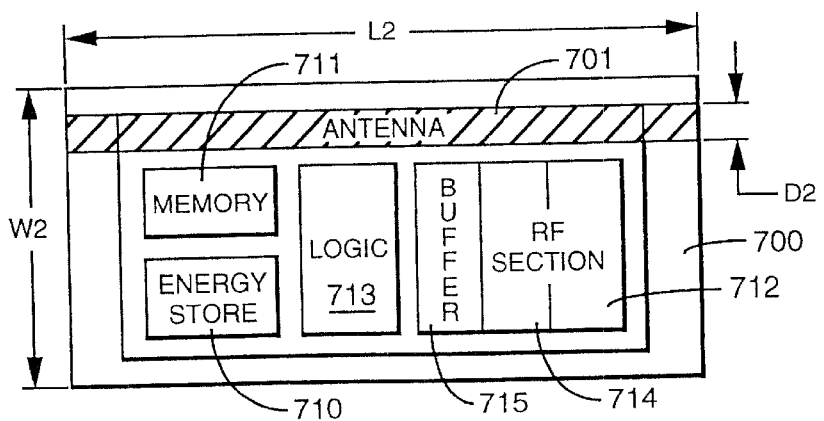
Figure 8A:
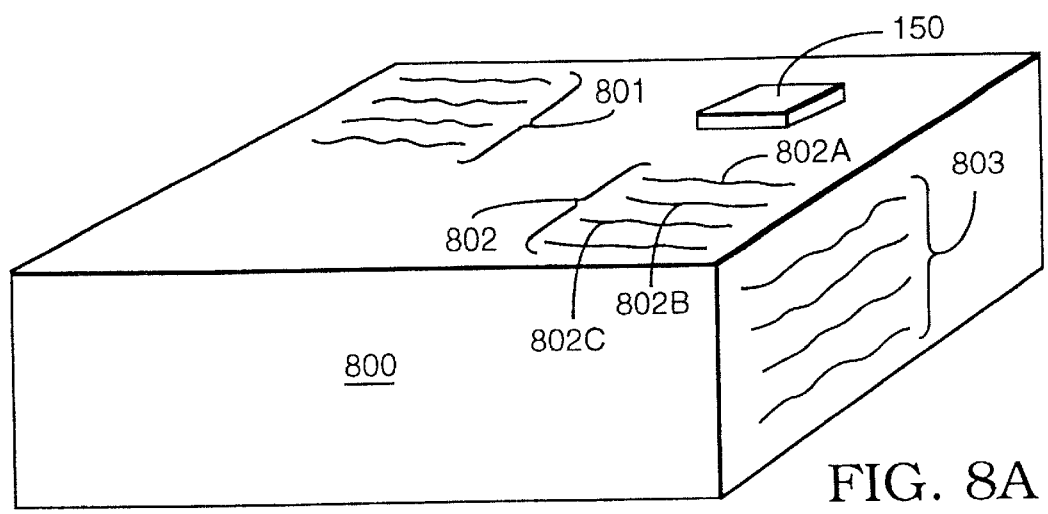
FIGS. 8A and 8B illustrate use of the die of FIG. 1A either (1) on a package to be mailed (FIG. 8A) or (2) in a package to be mailed (FIG. 8B).
Figure 8B:
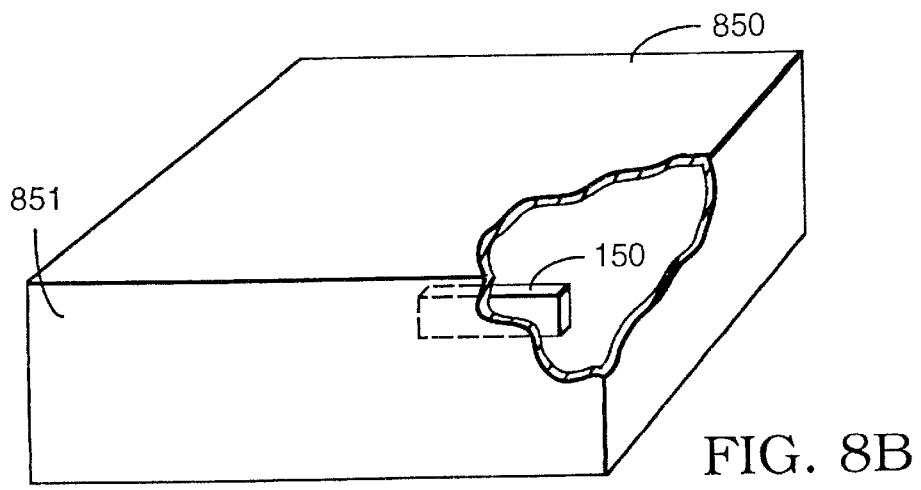

In another embodiment, integrated circuit (IC) die 100 is formed of only two dielectric layers, such as layers 101A and 101B, and a single conductive layer 700 (FIG. 7), with antenna 701 being formed by a deep trench process. Antenna 701 has a width D2, and a length L2 several times (e.g. 20 times) larger than width D2. All the other components in conductive layer 700 are identical to the corresponding components in conductive layer 102M (FIG. 6) described above, and many reference numerals in FIG. 7 are derived from the corresponding a reference numerals in FIG. 6 by adding 100.

In one embodiment, integrated circuit die 100 is used directly as an identification tag for an object (such as a package) 800, e.g. by mounting die 100 on package 800. In this embodiment, ROM 510 (FIG. 5A) in data source 233 is encoded with the object's data, such as mailing address (including, e.g. a first field 802A for a recipient of the object, a second field 802B for the street address, a third field 802C for the city, state and zip code) typically included in regions 801–802, and/or contents information typically included in region 803. On receipt of reply signal 120 from integrated circuit die 100, object 800 is automatically acted upon by machinery coupled to an interrogation unit, for example, transported, sorted or disposed off. Instead of mounting die 100 on package 800, a tag 150 of the type described herein can be mounted inside of a package 850, e.g. on an inner surface of wall 851 of package 850. In this embodiment, tag 150 communicates with an interrogation unit by a radio frequency signal that passes through wall 851.

Instead of, or in addition to mailing information, contents information in integrated circuit die 100 can include, for example, cooking data or instructions for cooking a food product enclosed within object 800, so that on receipt of a reply signal 120 the food product is automatically cooked by a microwave oven coupled to the interrogation unit. When used in a microwave oven, integrated circuit die 100 could be powered up using microwave energy from the microwave oven, and integrated circuit die 100 can provide real time information on the atmosphere surrounding the food product during cooking, e.g. the temperature and humidity.

In such an embodiment, integrated circuit die 100 can instruct the microwave oven when the food product has been cooked and to stop delivery of the microwave energy by the oven. Moreover, the same or similar integrated circuit die 100 can also be used to indicate to a refrigerator (prior to cooking of the food product) the temperature of the food product. For example, sensor 551 in integrated circuit die 100 can take periodic measurements and save the three highest temperature measurements to indicate if the food product is getting too warm and spoiled. Such information can be useful, for example, in vending machines that may suffer interruptions in power supply.

Sensor 551 in an integrated circuit die 100 can also be used to measure the acceleration of object 800 and store the three highest acceleration measurements, using energy from the acceleration to provide power to integrated circuit die 100, thereby to indicate the date and intensity of such acceleration incidents. Such information can be useful, for example, to decide claims of damages to fragile goods during shipment by common carriers (such as UPS). Integrated circuit die 100 can be attached to an object inside a package (of paper or cardboard) because power signal 110 and reply signal 120 can easily pass through such a package. Such a package should not be made of a wire screen, a conductive plastic, a RF screen, a metal foil or solid metal all of which interfere with RF communication between an interrogation unit and integrated circuit die 100 located inside the package.

The contents information stored in integrated circuit die 100 can also include pricing data of object 800, so that on receipt of reply signal 120 object 800 can be automatically billed in a grocery store or a department store by a check-out stand coupled to the interrogation unit, when a cart (not shown) containing the object passes adjacent to the check-out stand. Therefore integrated circuit die 100 eliminates the need to place a to-be-purchased object on a counter as required for conventional scanning by a bar code reader. In one embodiment, each shopping cart is equipped with a reader that determines the items being placed in the shopping cart and computes the total amount owed, thereby eliminating the need for checkout counters.

The contents information can also include material safety data for handling a hazardous object, so that on receipt of a reply signal 120, the object can be appropriately handled. Moreover, integrated circuit die 100 can have a sensor that supplies environmental data, so that on receipt of a reply signal, the temperature, pressure and/or humidity of the environment surrounding integrated circuit die 100 can be easily monitored.

In one example, power signal 110 transmits 63 pJ in 500 ms, i.e. 126 pW. In this particular example, integrated circuit die 100 receives 58 nW/cm$^2$ and therefore, the transmitter in an interrogation unit needs to be more powerful by a factor of 126×10$^3$, assuming the interrogation unit is one meter away. Therefore, the transmitter in the interrogation unit must transmit power signal 110 at 7 mW if the transmitter is isotropic.

In another embodiment, layers 110A–101M (FIG. 1) are formed of a conductive material, and layers 102A–102M are formed of a dielectric material. That is, in this particular embodiment, integrated circuit die 100 has two external surfaces 100A and 100B that are formed by conductive layers 101A and 101M respectively. In this particular embodiment, conductive layers 101A and 101M are thinner than the conventional conductive layers normally formed on a silicon die to create wire bond pads.

For example, layers 101A and 101M are not formed by growing a conductive layer, and rather are formed by evaporating a layer of, for example, aluminum. Therefore, in this example, conductive layers 101A and 101M have a thickness of 2000 Å, which is an order of magnitude smaller than the thickness of a grown conductive layer. Moreover, conductive layers 101A and 101M are formed to have a predetermined resistance for matching impedance of various components included in die 100.

In one variant of the embodiment, die 100 having the exposed conductive layers 101A and 101M is used directly as an energy holding tag, with a first conductive layer 101A being used as a radio frequency antenna 160 (FIG. 2A) and the second conductive layer 101M being used as a source of the ground reference voltage. In another variant of the embodiment, die 100 is mounted on a substrate (such as a sticker) 901 (FIG. 9) formed of, for example, a sheet of paper (or plastic or both) and conductive adhesive.

In one specific embodiment, substrate 901 has the appearance of a postage stamp, e.g. a length of 25 millimeters, a width of 25 millimeters and a thickness of 0.25 millimeters. Substrate 901 has formed thereon a conductive trace 902 in the form of a spiral. Conductive trace 902 can be formed by conductive ink printed on substrate 901. In one implementation, external surface 100A of conductive layer 101A in die 100 (FIG. 1) is electrically coupled to trace 902 by a layer of conductive adhesive interposed between substrate 901 and die 100. Trace 902 acts as a circularly polarized antenna for die 100. In another implementation, die 100 has two bond pads, e.g. bond pad 121 that is electrically coupled to trace 902 by a bond wire, and another bond pad 122 for ground.

In this embodiment, die 100 is devoid of an antenna, and therefore the device becomes inoperative when substrate 901 is separated from trace 902. Such a device provides a security measure when substrate 901 is attached to an object by another adhesive layer, because the paper or other fragile material that forms substrate 901 disintegrates when removed from the object. In such an example, the paper of substrate 901 is sufficiently thin so as to disintegrate when peeled off. In another embodiment, die 100 measures the force applied during removal of the device from an object by use of a MEMs beam, records the fact, and reports the fact during the next interrogation (e.g. assuming the device remains operable even after removal, as can be ensured by use of an internal antenna in die 100 in addition to or instead of the antenna formed by trace 902). Instead of measuring the force applied during removal, the device can measure any other function of connectiveness of the device to the object.

Instead of trace 902 being spiral, other shapes can also be used to form, for example, a bipolar antenna, by providing substrate 901 with a conductive layer (not shown). Instead of a bipolar antenna, a fractal antenna can be used as described in "Wireless: Fractal Antenna systems announces breakthrough antenna line," Cambridge Telecom Report, McGraw-Hill Companies, Inc. 1997 that is incorporated by reference herein in its entirety. The other exposed surface 100B of die 100 can be left alone, or alternatively, can be coupled to another conductive layer of another substrate (not shown) thereby to seal die 100 between the two substrates. The other substrate can have a conductive layer that is coupled to surface 100B of die 100 by conductive adhesive, thereby to provide a larger source for the ground reference voltage.

The antenna provided by substrate 901 (in the form of trace 902) is larger than an antenna in die 100, and allows an interrogation unit to transmit a power signal at a lower power to such a larger antenna. Moreover, substrate 901 secures die 100 so that die 100 can be attached to an object (e.g. object 800). Also, substrate 901 protects die 100 during transportation of object 800. Furthermore, substrate 901 can also carry some printed content, such as text and/or graphics normally present on a postage stamp. Instead of a postage stamp information, printed content on substrate 901 can indicate information about die 100, e.g. type, purpose or location.

Use of trace 902 on substrate 901 as an antenna eliminates the need for a separate antenna 701 (FIG. 7) formed on an inner layer of die 100. Use of an entire surface 100A (FIG. 1) of integrated circuit die 100 either as an antenna, or coupled through a conductive adhesive to trace 902 (FIG. 9) eliminates the need for bond pads (conventionally used in integrated circuit die), and therefore results in a smaller size for die 100 as compared to integrated circuit dies of the prior art. In one implementation, trace 902 is formed by printing with conductive ink on a sticker. The sticker contains printed information descriptive of the type of die 100 (e.g. whether die 100 is part of a file tag, a briefcase tag, a PC tag or a light fixture tag).

Figure 10:
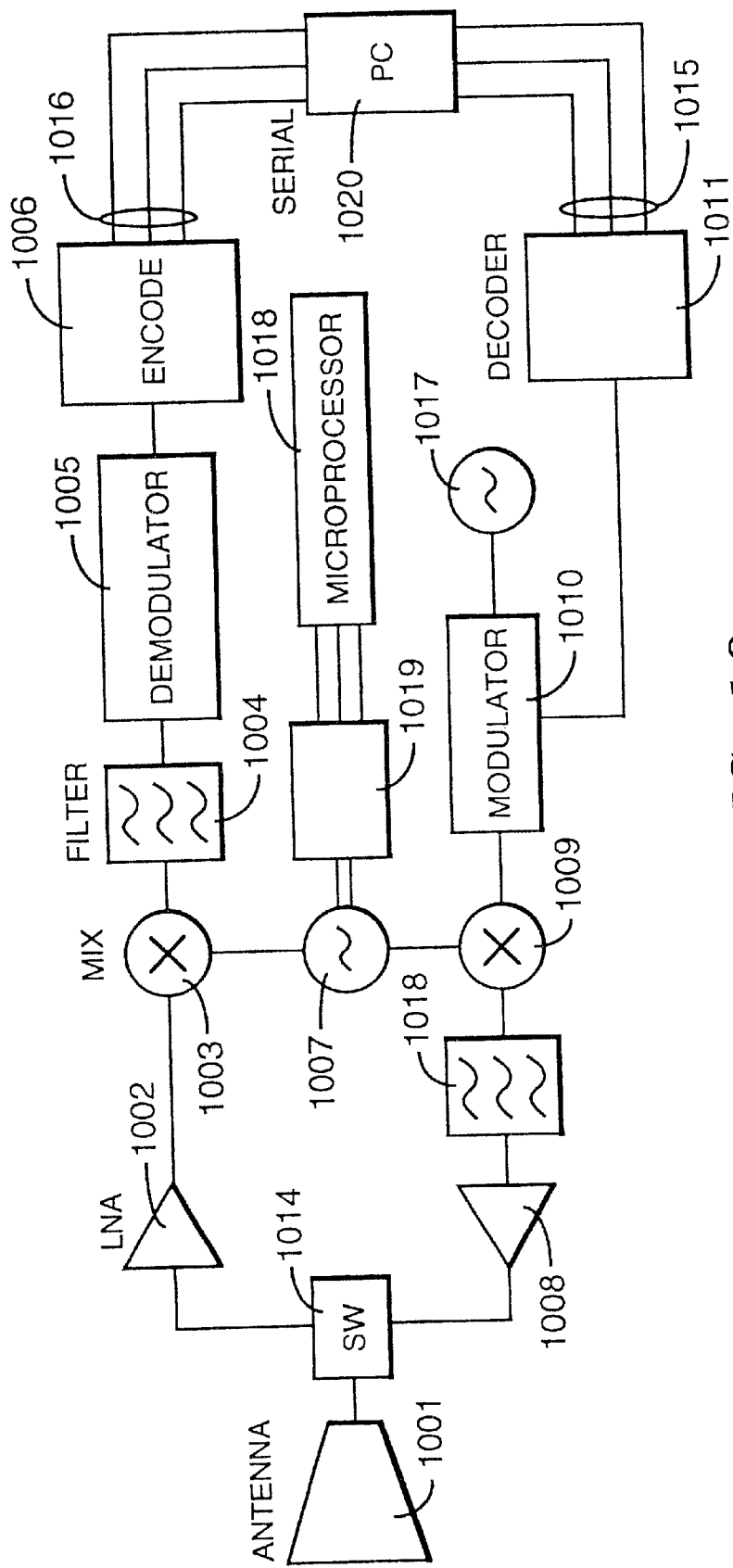
FIG. 10 illustrates, in a circuit diagram, an interrogation unit for use with one or more devices of the type illustrated in FIGS. 1A, 1B, 8A, 8B and 9.

An interrogation unit 1000 (FIG. 10) is used in various modes, e.g. write only, read only or read and write. In a write only mode, unit 1000 transmits a power signal 110 that is encoded with information to be stored by integrated circuit die 100. In response to such an encoded power signal 110, an IC die 100 stores the information. The stored information includes, in one example, mailing address of a recipient of a package on which IC die 100 is mounted. Note that the information being stored can be in the normal form, or enciphered in a manner well known to the skilled electrical engineer. To provide for enciphering, unit 1000 includes an enciphering circuit (not shown) and a deciphering circuit (also not shown). In another embodiment, a die 100 includes an encryption circuit that is used with a decryption circuit in unit 1000 to ensure security of data (such as information generated by a sensor) being transmitted in reply signal 120. Such circuits can use public and private keys so that the public key can be used by any interrogation unit 1000 to retrieve information from die 100. An encryption circuit need not be used in die 100 that is devoid of a sensor, because the information being transmitted is stored in encrypted form in die 100 by unit 1000.

Once the information has been stored, the information is read back by unit 1000, e.g. by transmitting an unencoded power signal 110. The unencoded power signal 110 can be generated any number of times, resulting in a corresponding number of reply signals 120, thereby resulting in a "write once, read many" mode of operation. Also, after using the unencoded power signal 110 one or more times, power signal 110 can be encoded with new information, and IC die 100 stores the new information (thereby allowing a package to be re-routed, similar to "inter-office" envelopes that are re-routed among individuals within an office). Depending on the implementation, IC die 100 either adds the new information to the information previously stored, or overwrites the previously stored information.

Alternatively, in another example, the stored information is all 0s, thereby to "cancel" the normal operation of IC die 100. Instead of all 0s, another predetermined code is used in yet another example, wherein the predetermined code triggers operation of a cancel logic 537 that self destructs as described above. In this example, IC die 100 is silent (does not send a reply message) when unit 1000 is operated in the write mode. Cancel logic 537 is useful, e.g. if die 100 is used in mailing a package, and the package has arrived at the destination. In such a case, die 100 is "canceled" in a manner similar to "cancellation" of a postage stamp.

In a "read only" mode, interrogation unit 1000 transmits a power signal 110 that is devoid of any information, and an IC die 100 responds with a reply signal 120 that contains information. Unit 1000 receives and decodes reply signal 120 and produces a serial output data stream carrying the information. In a read and write mode, unit 1000 transmits a power signal 110 that is encoded with information to be stored by integrated circuit die 100. In response to such an encoded power signal 110, an IC die 100 stores the information, and transmits a reply message containing information (i.e. sends a reply message) to unit 1000.

Interrogation unit 1000 can be either fixed position or portable. A fixed position interrogation unit 1000 derives power from a source of alternating current (AC). Power supply 1012 (FIG. 10) converts the AC to direct current (DC) signal having a voltage, Vsupply. The voltage Vsupply is provided to all electronic circuitry that makes up interrogation unit 1000. In one embodiment, interrogation unit 1000 includes a battery 1013 instead of power supply 1012, for portable operation. Interrogation unit 1000 operates as a transmitter/receiver (transceiver).

Specifically, in one implementation unit 1000 includes an RF antenna 1001 that provides 21 dBi gain and −3 dB beamwidth (directivity): 35 degrees (e.g. see Cushcraft/Signals part 1851N described on the Internet at www.cushcraft.com) to interrogation unit 1000 during transmission, by concentrating RF (radio frequency) signal in a tight beamwidth (e.g. 1 mm diameter beam), thus reducing power requirement and minimizing a potential operator hazard. Antenna 1001 can be, for example, Cushcraft/Signals Model S2406PC circular polarized, described in Cushcraft Technical Data sheet, that is incorporated by reference herein in its entirety.

In the transmit mode, a bus 1015 receives, from a PC 1020, serial data that is to be transferred to integrated circuit die 100 via antenna 1101. The serial data stream (including clock, data, enable) on bus 1015 is received by decoder 1011, and transformed into data burst packets using techniques well understood by wireless communication engineers. Decoder 1011 drives a signal to modulator 1010 which superimposes the received signal onto carrier signal generated by modulator 1010. The signal generated by modulator 1010 has an intermediate frequency (IF) that is hetrodyned to the operating frequency by mixer 1009. Mixer 1009 receives a signal at the just-described operating frequency from a frequency synthesizer 1007. In mixer 1009, two RF sidebands are generated and are present at the output terminal of mixer 1009. Bandpass filter 1018 selects the wanted sideband while rejecting the unwanted sideband. The output signal from filter 1018 is then amplified by power amplifier 1008. In the transmit mode, a switch 1014 couples power amplifier 1008 to antenna 1001 that transmits the side band provided by filter 1018.

In the receive or read mode, switch 1014 provides an RF path from antenna 1001 to low noise amplifier (LNA) 1002. LNA 1002 provides voltage gain while adding minimal thermal noise. The signal amplified signal from LNA 1002 is supplied to mixer 1004 where the hetrodyne process takes place. Mixer 1003 also receives an oscillating signal from an oscillator 1007 that is controlled by frequency synthesizer 1019. When the two signals are present in mixer 1003, two sidebands are generated. Low pass filter 1004 selects the wanted sideband while rejecting the unwanted. Filter 1004 also provides band limiting of the receive signal, limiting thermal noise, thus may be used to optimize reception of reply signal 120. The band-limited signal from filter 1004 is applied to demodulator 1005 from which a data signal is extracted for decoding by decoder 1006. Output of decoder 1006 is supplied on a line 1016 as a serial data stream to personal computer 1020.

In one example, LNA 1002, mixer 1003 and voltage controlled oscillator 1007 are together implemented by RF integrated circuit, part number MC13142 described in MOTOROLA Technical Data sheet that is incorporated by reference herein in its entirety. Similarly, power amplifier 1008 and mixer 1009 are together implemented by a RF integrated circuit, part number MC13146D, described in MOTOROLA Technical Data sheet that is incorporated by reference herein in its entirety.

Moreover, in this example, low pass filter 1004 is implemented by part number SCLF-21.4 described in Mini-Circuits Technical Data sheet that is incorporated by reference herein in its entirety. Furthermore, modulator 1010 and demodulator 1005 are each implemented in this example by part numbers RF2422 and RF2711, described in RF Micro-Devices Technical Data sheet that is incorporated by reference herein in its entirety.

Also, encoder 1011, decoder 1006, crystal oscillator 1017, microprocessor 1018, and frequency synthesizer 1019 are implemented in this example by respective part numbers MC145026, MC145027, MC12061, 68000 and MC45155-2 described in MOTOROLA Technical Data sheet that is incorporated by reference herein in its entirety.

In one embodiment, interrogation unit 1000 is included in an object that is enclosed in a package that in turn carries die 100. The object's interrogation unit periodically interrogates the package's die to confirm that the object is within the package. When die 100 is removed from the package, interrogation unit 1000 disables operation of the object. Thus, when the object is stolen (by removal of die 100), the object becomes inoperative and therefore useless to the thief. At a point of sale, interrogation unit 1000 is disabled so that a customer can operate the object in the normal manner after sale.

In another embodiment, a number of parts are assembled together to form an object, and each part has attached thereto a die 100. Therefore, on operation of interrogation unit 1000, each part in the current object responds with information that is provided by unit 1000 on a bill of materials (also called parts list) for the object. Such a parts list can be automatically checked against a predetermined list of parts required to assemble such an object to confirm that the current object contains all necessary parts. Thereafter, the parts list can be programmed by unit 1000 into another die 100 that is attached to the object, as a tag for the object as a whole.

In another embodiment, dice 100 are not tested during manufacturing of dice 100. Instead, in this embodiment, dice 100 are simply used at the time of attachment to an object, and are discarded if inoperative. Thus the manufacturing of dice 100 as described herein saves at least one step, as compared to the conventional manufacturing that requires testing.

Numerous modifications and adaptations of the embodiments described herein will be apparent to those skilled in the art of electrical engineering in view of the disclosure. For example, a device using discrete components can be used to implement circuit 200 (FIG. 2) although a integrated circuit die 100 has been disclosed in the above-described embodiments.

In another embodiment (not shown), integrated circuit die 100 includes a number of storage elements, and the logic state of each storage element is presented to the gate of a pass transistor that controls the amplification of RF transmission.

In yet another embodiment (also not shown), logic states of the stored data are applied to a voltage control oscillator to change the transmission frequency of reply signal 120, depending on the logic state. As discussed above, a counter is used to sequentially generate the logic state from each storage element.

Moreover, although in one embodiment, integrated circuit die 100 is completely devoid of any bond pads, in another embodiment, integrated circuit die 100 has one or two bond pads, for coupling to an external antenna.

Furthermore, although in one embodiment, integrated circuit die 100 is implemented in complementary metal oxide (CMOS) semiconductor technology, in another embodiment, integrated circuit die 100 is implemented using bipolar technology.

Although in two embodiments, the reference voltage potential VCC is 3.3 volts and 1.8 volts, lower reference voltage potential (e.g. 0.5 volt) or higher reference voltage potential (e.g. 5 volts) can also be used in other embodiment.

Moreover, although in one embodiment, signal transmitter 234 (FIG. 2D) includes a radio frequency modulator 430 (FIG. 4) other transmission circuits, such as an infrared modulator can be included in other embodiments of the invention.

Furthermore, although in one embodiment, an energy holding tag receives and transmits radio frequency signals, in an alternative embodiment, such a tag receives and transmits other types of electromagnetic signals, such as infrared signals, or ultraviolet signals. In such an alternative embodiment, the tag includes an infrared sensor and an infrared transmitter (such as infrared photodiode and an infrared diode).

In another embodiment, access decoder 530 does not have a burn in logic 536, and instead has another set of storage elements and comparator and read only memory (not shown), and uses these parts (in a manner similar to that described above) to compare another password received in access signal 130 (FIG. 2C) with a password stored in the ROM, and in case of a match drives the signal on line 535. Therefore, in this particular embodiment, access decoder 530 can be used to program the data in ROM 510 (FIG. 5A) any number of times by use of the second password.

Moreover, in another embodiment, the data is stored in ROM 510 by touching (either physically by making electrical contact or inductively) antenna 160 (FIG. 2A) and passing a digital signal for example via terminal 242 (FIG. 2C) that is coupled to the access decoder 530 (FIG. 5A). Touching of integrated circuit die 100 is not a disadvantage during mass production, because a machine that handles many dies per second can be used to download the data into integrated circuit die 100. Such a machine can be used, for example, at a post office or at a shipping office. The data can be read by powering up integrated circuit die 100 using a power signal 110 (FIG. 2A) as described above.

Furthermore, although power signal 100 is described in one embodiment as being a radio frequency signal, such a power signal can be an electrical signal that is transmitted to die 100 by touching as described above. Other signals, such as reply signal 120 can also be transmitted by die 100 during such touching, depending on the embodiment. Therefore, in one such alternative embodiment, all signals to and from die 100 are transmitted during touching by the above-described machine.

Moreover, even if integrated circuit die 100 can be programmed via a programming signal 140 (FIG. 2C), touching can be used as a backup in case of some failure, both for storing information in ROM 510 and retrieving information from ROM 510 (FIG. 5A). Also, instead of radio frequency signals, infrared signals can be used in other embodiments, e.g. by using a photodiode to receive power signal 110, and a light emitting diode to emit reply signal 120 (instead of an antenna). Such diodes can be formed within an integrated circuit die 100 as would be apparent to the skilled electrical engineer in view of the disclosure.

Also, an interrogation unit 1000 can be coupled to the Internet, so that an operator can remotely operate a number of such interrogation units 1000. In one embodiment, a group of such interrogation units 1000 are installed at predetermined locations (e.g. spaced a few meters apart) in a factory, e.g. over each of a number of bins, each bin containing parts (each having mounted thereon an individual IC die 100) that are to be used in the assembly of objects in the factory. Instead of parts in a factory, in another embodiment, interrogation units 1000 are installed in a warehouse or a store (such as a grocery store). A group of such interrogation units 1000 collectively implement a system (also called "object base") for retrieval of information from each group of IC die 1000 that are adjacent to a respective one of interrogation units 1000.

The just-described embodiment eliminates the need for manual entry of data during inventory, because inventory can be performed by an operator remotely polling each one of interrogation units 1000 in the group installed in the factory (or warehouse). Such inventory can be performed any number of times in a day, e.g. performed every hour, or every ten minutes, in a manner not possible when manual entry of data is required.

Furthermore, a variant of the just-described embodiment eliminates the need for inventory, by causing each interrogation unit 1000 to be operated periodically, e.g. every few seconds, to maintain up to date a record in interrogation unit 1000 that is available for query by an operator (via Internet or other network connection). The periodic operation causes each IC die 100 to inform an interrogation unit 100 within the detection range that it exists. In such a system, stealing of an object on which a die 100 is mounted would be very difficult, because if die 100 is removed from the object, die 100 becomes inoperative and unit 1000 knows immediately (at the next periodic operation) about the removal. Even if there is an attempt to move an object having an attached die 100, unit 1000 again knows immediately (at the next periodic operation) of the movement. Furthermore, proper removal of a number of such objects, such as loading in a truck at the warehouse is recorded by an interrogation unit 1000 mounted in the warehouse at the entrance to the truck, and such a unit 1000 generates a manifest for the truck.

In another implementation of such a system in a grocery store, such a unit 1000 at a check out stand generates the bill of sale indicating the objects being sold, their price and the total amount owed. In this implementation, a customer merely pushes a grocery cart through the check out aisle to trigger unit 1000, inserts a card (such as a credit card or a debit card) to authorize payment and is allowed to proceed out of the grocery store (e.g. via a gate at the check out stand that opens on authorization of payment), thereby eliminating the need for a cashier clerk at the check out stand.

In yet another embodiment, a to-be-machined object (such as a 2"×3"×5" piece of steel) has a die 100 that contains in memory instructions to be executed by a numerically controlled (NC) machine (such as a lathe or a shaper) to form a part from the object. When the object arrives at the NC machine (via a robot or a conveyor belt), the NC machine loads instructions from die 100 and machines the object, e.g. to form a bolt, in the process destroying die 100. Thereafter the NC machine attaches another IC die 100 to the machined object (also called "part") that identifies the machined object as a part (e.g. bolt).

Note that instead of to-be-machined objects, other objects to be processed (such as frozen food to be cooked) can be used in other embodiments. As noted above, a die 100 mounted on a package of the food product is queried e.g. at the appropriate moments (such as periodically, or after each cooking instruction) to check environmental parameters, such as the temperature and humidity in the package during cooking.

In yet another embodiment a stamp is produced with a die 100 attached to the stamp. The mail address is written to die 100 by the interrogation unit 1000. The stamp is attached to the letter or package. At each of the distribution or sorting stations (typically four such touches in routing mail from the originating post office to the recipient post office) the sorting equipment that includes an interrogation unit 1000 queries the die 100 to obtain the destination address and automatically sorts mail thereby eliminating the need for a sorting clerk in the distribution center or post office.

Various modifications and adaptations of the above described embodiments are encompassed by the attached claims.

What is claimed is:

1. A device comprising:
   a power supply having a power input terminal and a power supply line, the power supply including an energy store coupled between the power input terminal and the power supply line; and
   a signal transmitter having a reference voltage terminal, a data input line and a signal output terminal, the reference voltage terminal being coupled to the power supply line, the signal transmitter drawing stored energy from the energy store and using the stored energy to supply an electrical signal to the signal output terminal; and
   a single antenna, tie single antenna being coupled to each of the power input terminal and the signal output terminal, and
   wherein each of the power supply and the signal transmitter are formed in a single integrated circuit die; and
   wherein the single antenna is formed in the single integrated circuit, and the device is devoid of any bond pads; and
   wherein the energy store stores at least a portion of energy rectified from a first radio frequency signal received by the single antenna during an absorption period; and
   wherein the single antenna transmits, during a transmission period, a second radio frequency sign, the transmission period being at least an order of magnitude smaller than the absorption period.

2. The device of claim 1 wherein the data source comprises a sensor.

3. The device of claim 2 wherein the sensor is a temperature sensor.

4. The device of claim 1 wherein the data source comprises a counter and the data source supplies a signal to the signal transmitter after a delay period counted by the counter.

5. The device of claim 4 wherein the delay period has a random duration.

6. A device comprising:
   a power supply having a power input terminal and a power supply line, the power supply including an energy store coupled between the power input terminal and the power supply line; and
   a signal transmitter having a reference voltage terminal, a data input line and a signal output terminal, the reference voltage terminal being coupled to the power supply line, the signal transmitter drawing stored energy from the energy store and using the stored energy to supply an electrical signal to the signal output terminal;
   a data source having a terminal coupled to the data input line of the sign transmitter; and
   wherein the data source further comprises a circuit having a non-volatile memory; and
   wherein the circuit is responsive to a third electrical signal generated by the antenna on receipt of a third radio frequency signal encoded with data, the circuit storing the data in the non-volatile memory.

7. A device comprising:
   a power supply having a power input terminal and a power supply line, the power supply including an energy store coupled between the power input terminal and the power supply line; and
   a signal transmitter having a reference voltage terminal, a data input line and a signal output terminal, the reference voltage terminal being coupled to the power supply line, the signal transmitter drawing stored energy from the energy store and using the stored energy to supply an electrical signal to the signal output terminal
   a first conductive layer having a first external surface; and
   a second conductive layer; and
   a first dielectric layer interposed between the first conductive layer and the second conductive layer, the signal transmitter being formed in the second conductive layer; and
   an antenna formed in the first external surface.

8. The device of claim 7 further comprising:
   a first substrate having a conductive trace; and
   a conductive adhesive interposed between the first substrate and the first external surface;
   wherein the conductive adhesive electrically couples the first external surface to the conductive trace, the conductive surface forming at least a portion of the antenna.

9. The device of claim 8 wherein the conductive trace is spiral, and the substrate includes paper.

10. The device of claim 8 wherein the device has a second external surface formed by a third conductive layer included in the device, the device further comprising:
   a second dielectric layer interposed between the third conductive layer and the second conductive layer;
   wherein the device has a second substrate having a fourth conductive layer electrically coupled to the third conductive layer.

11. An apparatus comprising:
   an object; and
   an integrated circuit (IC) die supported by the object, the IC die comprising:
      a storage element having an input line and an output line, the storage element containing information about the object;
      an energy store having a power line, said energy store being coupled to the input line of the storage element;
      a rectifier coupled to the power line of the energy store;
      the rectifier supplies electrical energy extracted from a radio frequency signal to the power line of the energy store; and
      the energy store has a discharged state and a charged state, the energy store transitioning from the discharged state to the charged state by storing energy received on the power line over an absorption period, the energy store transitioning from the charged state to the discharged state by supplying the stored energy to the storage element over a transmission period, the transmission period being at least an order of magnitude smaller than the absorption period.

12. The apparatus of claim 11, further comprising:
   a signal transmitter coupled to the energy store; and
   an antenna coupled to the signal transmitter;
   the signal transmitter and the antenna being formed in integrated circuit die, the integrated circuit die being devoid of any bond pads.

13. The apparatus of claim 11, wherein the storage element includes a mailing address associated with the object.

14. The apparatus of claim 11, further comprising a counter coupled to the signal transmitter that supplies a signal to a signal transmitter after a delay period, the delay period having a random duration.

15. The apparatus of claim 11, further comprising an oscillator coupled to the storage element.

16. An apparatus comprising:
   an object; and
   an integrated circuit (IC) die supported by the object, the IC die comprising:
      a storage element having an input line and an output line, the storage element containing information about the object;
      an energy store having a power line, said energy store being coupled to the input line of the storage element;
      a rectifier coupled to the power line of the energy store;
      the storage element supplies the information on the data output line in response to a signal on the power line;
      the storage element using at least a first portion of the electrical energy to supply the information; and
      the apparatus includes an antenna, the antenna using at least a second portion of the electrical energy to transmit a radio frequency signal carrying the data signal.

17. The apparatus of claim 16, wherein the antenna is formed in the integrated circuit die, the integrated circuit die being devoid of bond pads.

18. The apparatus of claim 16, wherein the energy store has a discharged state and a charged state, the energy store transitioning from the discharged state to the charged state by storing energy received on the power line over an absorption period, the energy store transitioning from the charged state to the discharged state by supplying the stored energy to the storage element over a transmission period, the transmission period being at least an order of magnitude smaller than the absorption period.

19. The apparatus of claim 16, wherein the storage element includes a mailing address associated with the object.

20. The apparatus of claim 16, further comprising a counter coupled to the signal transmitter that supplies a signal to a signal transmitter after a delay period, the delay period having a random duration.

21. The apparatus of claim 16, further comprising an oscillator coupled to the storage element.

22. An apparatus comprising:
   an object; and
   an integrated circuit (IC) die supported by the object, the IC die comprising:
      a storage element having an input line and an output line, the storage element containing information about the object;
      an energy store having a power line, said energy store being coupled to the input line of the storage element;
      a rectifier coupled to the power line of the energy store;
      the information includes a mailing address indicating a recipient of the object.

23. The apparatus of claim 22, further comprising:
   a signal transmitter coupled to the energy store; and
   an antenna coupled to the signal transmitter;
   the signal transmitter and the antenna being formed in integrated circuit die, the integrated circuit die being devoid of any bond pads.

24. The apparatus of claim 22, wherein the energy store has a discharged state and a charged state, the energy store transitioning from the discharged state to the charged state by storing energy received on the power line over an absorption period, the energy store transitioning from the charged state to the discharged state by supplying the stored energy to the storage element over a transmission period, the transmission period being at least an order of magnitude smaller than the absorption period.

25. The apparatus of claim 22, wherein the storage element includes a mailing address associated with the object.

26. The apparatus of claim 22, further comprising a counter coupled to the signal transmitter that supplies a signal to a signal transmitter after a delay period, the delay period having a random duration.

27. The apparatus of claim 22, further comprising an oscillator coupled to the storage element.

28. A device having only one integrated circuit die, the integrated circuit die being at least partially enclosed in an encapsulant, the device die being free of leads or bands for connection to any electronic component external to the device;
   wherein the integrated circuit die comprises a radio frequency modulator; and
   wherein the integrated circuit further comprises an energy store having a power supply line coupled to the radio frequency modulator; and wherein the energy store stores at least a portion of energy rectified from a first signal incident on the integrated circuit die during an absorption period passes stored energy to the radio frequency modulator during a transmission period, the transmission period being at least an order of magnitude smaller than the absorption period.

29. A device having only one integrated circuit die, the integrated circuit die being at least partially enclosed in an encapsulant, the device die being free of leads or pads for connection to any electronic component external to the device, the integrated circuit comprising;
   a radio frequency modulator; and
   a data source coupled to the radio frequency modulator, wherein the data source comprises a thermistor.

30. The device of claim 29, further comprising an antenna formed in the integrated circuit die.

31. The device of claim 29, further comprising an energy store having a power line, the energy store being coupled to the data source wherein the energy store has a discharged state and a charged state, the energy store transitioning from the discharged state to the charged state by storing energy received on the power line over an absorption period, the energy store transitioning from the charged state to the discharged state by supplying the stored energy to the storage element over a transmission period, the transmission period being at least an order of magnitude smaller than the absorption period.

32. The device of claim 29, further comprising a counter coupled to the signal transmitter that supplies a signal to a signal transmitter after a delay period, the delay period having a random duration.

33. A device having only one integrated circuit die, the integrated circuit die being at least partially enclosed in an encapsulant, the device die being free of leads or pads for connection to any electronic component external to the device, the integrated circuit comprising:
   a radio frequency modulator; and
   a data source coupled to the radio frequency modulator, wherein the data source comprises a sensor, wherein the sensor includes a pressure transducer.

34. The device of claim 33, further comprising an antenna formed in the integrated circuit die.

35. The device of claim 33, further comprising an energy store having a power line, the energy store being coupled to the data source wherein the energy store has a discharged state and a charged state, the energy store transitioning from the discharged state to the charged state by storing energy received on the power line over an absorption period, the energy store transitioning from the charged state to the discharged state by supplying the stored energy to the storage element over a transmission period, the transmission period being at least an order of magnitude smaller than the absorption period.

36. The device of claim 33, further comprising a counter coupled to the signal transmitter that supplies a signal to a signal transmitter after a delay period, the delay period having a random duration.

37. A device having only one integrated circuit die, the integrated circuit die being at least partially enclosed in an encapsulant, the device die being free of leads or pads for connection to any electronic component external to the device, the integrated circuit comprising:
   a radio frequency modulator; and
   a data source coupled to the radio frequency modulator, wherein the data source comprises a sensor, wherein the sensor includes an accelerometer.

38. The device of claim 37, further comprising an antenna formed in the integrated circuit die.

39. The device of claim 37, further comprising an energy store having a power line, the energy store being coupled to the data source wherein the energy store has a discharged state and a charged state, the energy store transitioning from the discharged state to the charged state by storing energy received on the power line over an absorption period, the energy store transitioning from the charged state to the discharged state by supplying the stored energy to the storage element over a transmission period, the transmission period being at least an order of magnitude smaller than the absorption period.

40. The device of claim 37, further comprising a counter coupled to the signal transmitter that supplies a signal to a signal transmitter after a delay period, the delay period having a random duration.

41. A device having only one integrated circuit die, the integrated circuit die being at least partially enclosed in an encapsulant, the device die being free of leads or pads for connection to any electronic component external to the device, the integrated circuit comprising:
   a radio frequency modulator; and
   a data source coupled to the radio frequency modulator, wherein the data source comprises a humidity sensor.

42. The device of claim 41, further comprising an antenna formed in the integrated circuit die.

43. The device of claim 41, further comprising an energy store having a power line, the energy store being coupled to the data source wherein the energy store has a discharged state and a charged state, the energy store transitioning from the discharged state to the charged state by storing energy received on the power line over an absorption period, the energy store transitioning from the charged state to the discharged state by supplying the stored energy to the storage element over a transmission period, the transmission period being at least an order of magnitude smaller than the absorption period.

44. The device of claim 41, further comprising a counter coupled to the signal transmitter that supplies a signal to a signal transmitter after a delay period, the delay period having a random duration.

45. A device having only one integrated circuit die, the integrated circuit die being at least partially enclosed in an encapsulant, the device die being free of leads or pads for connection to any electronic component external to the device, the integrated circuit comprising:
   a radio frequency modulator; and
   a data source coupled to the radio frequency modulator, wherein the data source comprises a sensor, further comprising a calibration device for calibrating said sensor.

46. The device of claim 45, further comprising an antenna formed in the integrated circuit die.

47. The device of claim 45, further comprising an energy store having a power line, the energy store being coupled to the data source wherein the energy store has a discharged state and a charged state, the energy store transitioning from the discharged state to the charged state by storing energy received on the power line over an absorption period, the energy store transitioning from the charged state to the discharged state by supplying the stored energy to the storage element over a transmission period, the transmission period being at least an order of magnitude smaller than the absorption period.

48. The device of claim 45, further comprising a counter coupled to the signal transmitter that supplies a signal to a signal transmitter after a delay period, the delay period having a random duration.

49. A device comprising:
a single integrated circuit die being fie of leads or pads for connection to an electronic components external to the die;
a signal transmitter formed in the die;
an antenna formed in the die, the antenna being coupled to the signal transmitter;
an energy store formed in the integrated circuit die and coupled to the signal transmitter, the energy store having a power line, the energy store being coupled to the data source wherein the energy store has a discharged state and a charged state, the energy store transitioning from the discharged state to the charged state by storing energy received on the power line over an absorption period, the energy store transitioning from the charged state to the discharged state by supplying the stored energy to the storage element over a transmission period, the transmission period being at least an order of magnitude smaller than the absorption period.

50. A device comprising:
a single integrated circuit die being free of leads or pads for connection to an electronic components external to the die;
a signal transmitter formed in the die;
an antenna formed in the die, the antenna being coupled to the signal transmitter;
a storage element coupled to the signal transmitter, the storage element being formed in the integrated circuit die and including mailing address information.

51. A device comprising:
a single integrated circuit die being free of leads or pads for connection to an electronic components external to the die;
a signal transmitter formed in the die;
an antenna formed in the die, the antenna being coupled to the signal transmitter;
a counter coupled to the signal transmitter, the counter supplying a signal to the signal transmitter after a delay period counted by the counter, the delay period having a random duration.

52. A device comprising:
a single integrated circuit die being free of leads or pads for connection to an electronic components external to the die;
a signal transmitter formed in the die;
an antenna formed in the die, the antenna being coupled to the signal transmitter;
a data source coupled to the signal transmitter, the data source having an input line and an output line, the data source providing information about an associated object;
an energy store having a power line, the energy store being coupled to the data source input line;
a rectifier coupled to tile power line, the rectifier supplies electrical energy from a power signal to the energy store power line;
the data source supplies the information on the data source output line in response to a power signal on the power input line;
the data source using at least a first portion of the electrical energy to supply the information;
the antenna using a second portion of the electrical energy to transmit a signal carrying the information.

53. A device comprising:
an integrated circuit die;
a signal generator formed in the integrated circuit die;
an energy store formed in the integrated circuit die and coupled to the signal generator, the energy store having a power line;
the energy store has a discharged state and a charged state, the energy store transitioning from the discharged state to the charged state by storing energy received on the power line over an absorption period, the energy store transitioning from the charged state to the discharged state by supplying the stored energy to the signal generator over a transmission period, the transmission period being at least an order of magnitude smaller than the absorption period.

54. The device of claim 53, further comprising an antenna formed in the integrated circuit die and coupled to the signal generator, wherein the integrated circuit die is devoid of any pads or leads for connection to any electronic component external to the integrated circuit die.

55. The device of claim 53, wherein the signal generator further comprises a storage element including mailing address information.

56. The device of claim 53, the signal generator further comprises a counter and a signal transmitter, the counter supplies a signal to the signal transmitter after a delay period counted by the counter, the delay period having a random duration.

57. A device comprising:
an integrated circuit die;
an storage element formed in the integrated circuit die, the storage element including mailing address information;
a single transmitter coupled to the storage element for transmitting the mailing address information;
an energy store formed in the integrated circuit die and coupled to the signal transmitter, the energy store having a power line, energy store being coupled to the data source wherein the energy store has a discharged state and a charged state, the energy store transitioning from the discharged state to the charged state by storing energy received on the power line over an absorption period, the energy store transitioning from the charged state to the discharged state by supplying the stored energy to the storage element over a transmission period, the transmission period being at least an order of magnitude smaller than the absorption period.

58. A device comprising:
an integrated circuit die;
a storage element formed in the integrated circuit die, the storage element including mailing address information;
a signal transmitter coupled to the storage element for transmitting the mailing address information;
a counter coupled to the signal transmitter, the counter supplies a signal to the signal transmitter after a delay period counted by the counter, the delay period having a random duration.

59. An integrated circuit die comprising:
a storage element having an input line and an output line, the storage element containing information about the object;
an energy store having a power line, said energy store being coupled to the input line of the storage element;
a rectifier coupled to the power line of the energy store;

the rectifier supplies electrical energy extracted from a radio frequency signal to the power line of the energy store; and the energy store has a discharged state and a charged state, the energy store transitioning from the discharged state to the charged state by storing energy received on the power line over an absorption period, the energy store transitioning from the charged state to the discharged state by supplying the stored energy to the storage element over a transmission period, the transmission period being at least an order of magnitude smaller than the absorption period.

60. The integrated circuit of claim 59, further comprising:

a signal transmitter coupled to the energy store; and an antenna coupled to the signal transmitter;

the signal transmitter and the antenna being formed in integrated circuit die, the integrated circuit die being devoid of any bond pads.

61. The integrated circuit of claim 59, wherein the storage element includes a mailing address.

62. The integrated circuit of claim 59, further comprising a counter coupled to the signal transmitter that supplies a signal to a signal transmitter after a delay period, the delay period having a random duration.

63. An integrated circuit comprising:

a storage element having an input line and an output line, the storage element containing information about the object;

an energy store having a power line, said energy store being coupled to the input line of the storage element;

a rectifier coupled to the power line of the energy store;

the storage element supplies the information on the data output line in response to a signal on the power line;

the storage element using at least a first portion of the electrical energy to supply the information; and the apparatus includes an antenna, the antenna using at least a second portion of the electrical energy to transmit a radio frequency signal carrying the data signal.

64. The integrated circuit of claim 63, wherein the antenna is formed in the integrated circuit die, the integrated circuit die being devoid of bond pads.

65. The integrated circuit of claim 63, wherein the energy store has a discharged state and a charged state, the energy store transitioning from the discharged state to the charged state by storing energy received on the power line over an absorption period, the energy store transitioning from the charged state to the discharged state by supplying the stored energy to the storage element over a transmission period, the transmission period being at least an order of magnitude smaller than the absorption period.

66. The integrated circuit of claim 63, wherein the storage element includes a mailing address.

67. The apparatus of claim 63, further comprising a counter coupled to the signal transmitter that supplies a signal to a signal transmitter after a delay period, the delay period having a random duration.

68. An integrated circuit die comprising:

a storage element having an input line and an output line, the storage element containing information about the object;

an energy store having a power line, said energy store being coupled to the input line of the storage element;

a rectifier coupled to the power line of the energy store;

the information includes a mailing address indicating a recipient of the object.

69. The integrated circuit die of claim 68, further comprising:

a signal transmitter coupled to the energy store; and an antenna coupled to the signal transmitter;

the signal transmitter and the antenna being formed in integrated circuit die, the integrated circuit die being devoid of any bond pads.

70. The integrated circuit die of claim 68, wherein the energy store has a discharged state and a charged state, the energy store transitioning from the discharged state to the charged state by storing energy received on the power line over an absorption period, the energy store transitioning from the charged state to the discharged state by supplying the stored energy to the storage element over a transmission period, the transmission period being at least an order of magnitude smaller than the absorption period.

71. The integrated circuit die of claim 68, wherein the storage element includes a mailing address.

72. The integrated circuit die of claim 68, further comprising a counter coupled to the signal transmitter that supplies a signal to a signal transmitter after a delay period, the delay period having a random duration.

* * * * *